(12) United States Patent
Chen et al.

(10) Patent No.: US 12,504,641 B2
(45) Date of Patent: Dec. 23, 2025

(54) OPTICAL LENS ASSEMBLY AND HEAD-MOUNTED ELECTRONIC DEVICE

(71) Applicant: NEWMAX TECHNOLOGY CO., LTD., Taichung (TW)

(72) Inventors: Ping-Yi Chen, Taichung (TW); Po-Yu Chen, Taichung (TW); Fei-Hsin Tsai, Taichung (TW)

( * ) Notice: Subject to any disclaimer, the term of this patent is extended or adjusted under 35 U.S.C. 154(b) by 689 days.

(21) Appl. No.: 17/868,797

(22) Filed: Jul. 20, 2022

(65) Prior Publication Data
US 2023/0341697 A1 Oct. 26, 2023

(30) Foreign Application Priority Data

Apr. 21, 2022 (TW) .................................. 111115286

(51) Int. Cl.
| | | |
|---|---|---|
| *G02B 13/18* | (2006.01) | |
| *G02B 9/06* | (2006.01) | |
| *G02B 25/00* | (2006.01) | |
| *G02B 27/28* | (2006.01) | |
| *G06F 1/16* | (2006.01) | |

(52) U.S. Cl.
CPC .............. *G02B 27/28* (2013.01); *G02B 9/06* (2013.01); *G02B 13/18* (2013.01); *G02B 25/001* (2013.01); *G06F 1/163* (2013.01)

(58) Field of Classification Search
CPC .......... G02B 27/28; G02B 9/06; G02B 13/18; G02B 25/001; G02B 13/003; G02B 13/0055; G02B 13/0065; G02B 13/06; G02B 27/0172; G06F 1/163
See application file for complete search history.

(56) References Cited

U.S. PATENT DOCUMENTS

| | | | | |
|---|---|---|---|---|
| 11,378,811 | B2* | 7/2022 | Geng | G02B 27/28 |
| 11,782,279 | B2* | 10/2023 | Ouderkirk | G02B 27/0172 |
| | | | | 349/11 |
| 2002/0024743 | A1* | 2/2002 | Endo | G02B 27/0172 |
| | | | | 359/645 |
| 2014/0347739 | A1* | 11/2014 | Okano | G02B 25/001 |
| | | | | 359/646 |

(Continued)

OTHER PUBLICATIONS

Yabe, Akira "Optimization in Lens Design" (Year: 2018).*

*Primary Examiner* — Bumsuk Won
*Assistant Examiner* — John Curtis Sipes
(74) *Attorney, Agent, or Firm* — Bruce Stone LLP; Joseph A. Bruce

(57) ABSTRACT

An optical lens assembly includes, in order from a visual side to an image source side: a first lens with positive refractive power; an optical element including, in order from the visual side to the image source side, an absorptive polarizer, a reflective polarizer and a first phase retarder; a second lens with positive refractive power; a partial-reflective-partial-transmissive element; a second phase retarder; and an image source plane. The optical lens assembly has a total of two lenses with refractive power. A focal length of the optical lens assembly is f, a maximum image-source height of the optical lens assembly is INM, a focal length of the first lens is f1, a focal length of the second lens is f2, and following conditions are satisfied: $0.40<\text{IMH}/f<1.26$ and $0.21<f2/f1<2.35$. A head-mounted electronic device includes the optical lens assembly.

17 Claims, 12 Drawing Sheets

(56) References Cited

U.S. PATENT DOCUMENTS

| | | | |
|---|---|---|---|
| 2019/0377182 A1* | 12/2019 | Sharp | G02B 5/3083 |
| 2020/0049992 A1* | 2/2020 | Peng | G06F 3/012 |
| 2020/0284963 A1* | 9/2020 | Yun | G02B 5/3083 |
| 2024/0160005 A1* | 5/2024 | Wong | G02B 17/0804 |

* cited by examiner

OPTICAL LENS ASSEMBLY AND HEAD-MOUNTED ELECTRONIC DEVICE

BACKGROUND

Field of the Invention

The present invention relates to an optical lens assembly and a head-mounted electronic device, and more particularly to an optical lens assembly applicable to head-mounted electronic devices.

Description of Related Art

With the development of the semiconductor industry, the functions of various consumer electronic products are increasingly powerful, and the emergence of various services of the software application end, providing consumers with more choices. Head-mounted displays are born when the market is no longer satisfied with handheld electronic products. However, the current head-mounted displays are weight-heavy and has poor image quality.

The present invention mitigates and/or obviates the aforementioned disadvantages.

SUMMARY

The objective of the present invention is to provide an optical lens assembly and a head-mounted electronic device, whereby the weight of the head-mounted electronic device is reduced due to the optical lens assembly with a folded light path passing therethrough and the image quality can be ensured when specific conditions of lenses with refractive power in the optical lens assembly are satisfied.

Therefore, an optical lens assembly in accordance with an embodiment of the present invention includes, in order from a visual side to an image source side: a first lens with positive refractive power, including a visual-side surface, and the visual-side surface of the first lens being convex in a paraxial region thereof; an optical element including, in order from the visual side to the image source side, an absorptive polarizer, a reflective polarizer and a first phase retarder; a second lens with positive refractive power, including a visual-side surface and an image source-side surface, the image source-side surface of the second lens being convex in a paraxial region thereof, and at least one of the visual-side surface and the image source-side surface of the second lens being aspheric; a partial-reflective-partial-transmissive element; a second phase retarder; and an image source plane.

Optionally, a focal length of the optical lens assembly is f, a maximum image-source height of the optical lens assembly is IMH, a focal length of the first lens is f1, a focal length of the second lens is f2, and following conditions are satisfied: $0.40<\text{IMH}/f<1.26$ and $0.21<f2/f1<2.35$. These are conducive to the more appropriate distribution of refractive power of the optical lens assembly, which can reduce the aberration.

Optionally, the optical lens assembly has a total of two lenses with refractive power.

Optionally, a central thickness of the first lens along an optical axis is CT1, a central thickness of the second lens along the optical axis is CT2, and the following condition is satisfied: $0.62<\text{CT2}/\text{CT1}<6.97$, which is conducive to ensuring that the lens thickness of the lens device can meet the processing requirement of the manufacturing process of lens devices under the sufficient image quality.

Optionally, a central thickness of the first lens along the optical axis is CT1, a displacement in parallel to the optical axis from an intersection between the visual-side surface of the first lens and the optical axis to a maximum effective radius position on the visual-side surface of the first lens is TDP1, and the following condition is satisfied: $0.98<\text{CT1}/\text{TDP1}<5.79$, which is favorable to the achievement of the optimal performance of the optical lens assembly and the optimal stability of assembling the first lens.

Optionally, a focal length of the optical lens assembly is f, the focal length of the first lens is f1, and the following condition is satisfied: $0.04<f/f1<0.28$, which is favorable to enhancing the wide-angle property of the optical lens assembly, providing a larger angle of view and maintaining the illuminance of the optical lens assembly.

Optionally, a radius of curvature of the visual-side surface of the first lens is R1, the focal length of the first lens is f1, and the following condition is satisfied: $0.33<\text{R1}/f1<0.76$, which is favorable to effectively improving the distortion of the optical lens assembly, reducing the aberration of the optical lens assembly, and reducing the size of the lens more.

Optionally, a focal length of the optical lens assembly is f, a focal length of the second lens is f2, and the following condition is satisfied: $0.07<f/f2<0.30$, which is favorable to enhancing the wide-angle property of the optical lens assembly, providing a larger angle of view and maintaining the illuminance of the optical lens assembly.

Optionally, a radius of curvature of the image source-side surface of the second lens is R4, the focal length of the second lens is f2, and the following condition is satisfied: $-1.20<\text{R4}/f2<-0.22$, which is favorable to effectively reducing the image field curvature, enhancing the image quality of the optical lens assembly and ensuring the lens formability.

Optionally, a distance from the visual-side surface of the first lens to the image source plane along the optical axis is TL, the radius of curvature of the visual-side surface of the first lens is R1, and the following condition is satisfied: $2.05<\text{R1}/\text{TL}<12.83$, which is favorable to maintaining suitable lens formability.

Optionally, an Abbe number of the first lens is vd1, an Abbe number of the second lens is vd2, a refractive index of the first lens is nd1, and the following condition is satisfied: $0.93<(\text{vd1}*\text{nd1})/\text{vd2}<2.16$, which is favorable to achieving more appropriate arrangement of the first lens and the second lens in material, so as to provide better image quality.

Optionally, a radius of curvature of the visual-side surface of the first lens is R1, the radius of curvature of the image source-side surface of the second lens is R4, and the following condition is satisfied: $-2.74<\text{R1}/\text{R4}<-0.54$, which is conducive to preventing the radii of curvature from being too small and reducing the sensitivity to the assembly tolerance as the two radii of curvature are conditioned by each other.

Optionally, a radius of curvature of the visual-side surface of the second lens is R3, the radius of curvature of the image source-side surface of the second lens is R4, and the following condition is satisfied: $-0.83<\text{R4}/\text{R3}<0.49$, which is conducive to preventing the radii of curvature from being too small and reducing the sensitivity to the assembly tolerance as the two radii of curvature are conditioned by each other.

Optionally, a distance from the visual-side surface of the second lens to the image source plane along the optical axis is T2M, the central thickness of the second lens along the optical axis is CT2, and the following condition is satisfied: $0.68<\text{T2M}/\text{CT2}<2.37$, which is favorable to achieving a proper balance between the lens formability and the refractive power of the second lens.

Optionally, a distance from the visual-side surface of the first lens to the image source plane along the optical axis is TL, the maximum image-source height of the optical lens assembly is IMH, and the following condition is satisfied: 0.54<TL/IMH<1.80, which is favorable to achieving a proper balance between the miniaturization of the optical lens assembly and the size of the light-emitting area of the image source plane.

Optionally, a radius of curvature of the image source-side surface of the second lens is R4, a refractive index of the second lens is nd2, and the following condition is satisfied: −116.45 mm<R4/nd2<−19.09 mm, which is favorable to optimizing the balance between the lens formability and the performance of the optical lens assembly under the selection of different materials for the second lens.

Optionally, the image source-side surface of the second lens is convex in a paraxial region thereof.

Optionally, the partial-reflective-partial-transmissive element has an average light reflectance of at least 30%, preferably 50%, in the visible light range.

Optionally, the optical element further includes an anti-reflection film that is closer to the image source side than the first phase retarder.

Optionally, the focal length of the optical lens assembly is f, and the following condition is satisfied: 12.07 mm<f<38.00 mm.

Optionally, a maximum angle of view of the optical lens assembly is FOV, and the following condition is satisfied: 76.5 degrees<FOV<132.0 degrees.

Optionally, the distance from the visual-side surface of the first lens to the image source plane along the optical axis is TL, and the following condition is satisfied: 10.39 mm<TL<29.54 mm.

Optionally, the maximum image-source height of the optical lens assembly is IMH, and the following condition is satisfied: 8.08 mm<IMH<29.63 mm.

Moreover, an optical lens assembly in accordance with an embodiment of the present invention includes, in order from a visual side to an image source side: a first lens with positive refractive power, including a visual-side surface, and the visual-side surface of the first lens being convex in a paraxial region thereof; an optical element including, in order from the visual side to the image source side, an absorptive polarizer, a reflective polarizer and a phase retarder (i.e., first phases retarder); a second lens with positive refractive power, including a visual-side surface and an image source-side surface, the image source-side surface of the second lens being convex in a paraxial region thereof, and at least one of the visual-side surface and the image source-side surface of the second lens being aspheric; and a partial-reflective-partial-transmissive element; a wherein a central thickness of the first lens along an optical axis is CT1, a central thickness of the second lens along the optical axis is CT2, a displacement in parallel to the optical axis from an intersection between the visual-side surface of the first lens and the optical axis to a maximum effective radius position on the visual-side surface of the first lens is TDP1, the focal length of the optical lens assembly is f, the focal length of the second lens is f2, a radius of curvature of the visual-side surface of the first lens is R1, a radius of curvature of the visual-side surface of the second lens is R3, a radius of curvature of the image source-side surface of the second lens is R4, a distance from the visual-side surface of the first lens to the image source plane along an optical axis is TL, a distance from the visual-side surface of the second lens to the image source plane along an optical axis is T2M, the maximum image-source height of the optical lens assembly is IMH, a refractive index of the second lens is nd2, and at least one of following conditions is satisfied: 0.98<CT1/TDP1<5.79; 0.07<f/f2<0.30; −1.20<R4/f2<−0.22; 2.05<R1/TL<12.83; −2.74<R1/R4<−0.54; −0.83<R4/R3<0.49; 0.68<T2M/CT2<2.37; 0.54<TL/IMH <1.80; and −116.45 mm<R4/nd2<−19.09 mm.

Optionally, the optical lens assembly has a total of two lenses with refractive power.

Optionally, the image source-side surface of the second lens is convex in a paraxial region thereof.

Optionally, the partial-reflective-partial-transmissive element has an average light reflectance of at least 30% in the visible light range, preferably 50% average light reflectance.

Optionally, the optical element further includes an anti-reflection film that is closer to the image source side than the first and second phase retarders.

Optionally, the focal length of the optical lens assembly is f, and following condition is satisfied: 12.07 mm<f<38.00 mm.

Optionally, a maximum field of view of the optical lens assembly is FOV, and following condition is satisfied: 76.5 degrees<FOV<132.0 degrees.

Optionally, the distance from the visual-side surface of the first lens to the image source plane along the optical axis is TL, and following condition is satisfied: 10.39 mm<TL<29.54 mm.

Optionally, the maximum image-source height of the optical lens assembly is IMH, and following condition is satisfied: 8.08 mm<IMH<29.63 mm.

In addition, a head-mounted electronic device in accordance with the present invention includes a housing, the optical lens assembly of one of the aforementioned embodiments disposed in the housing, an image source disposed on an image source plane of the optical lens assembly in the housing, and a controller disposed in the housing and electrically connected to the image source.

The present invention will be presented in further details from the following descriptions with the accompanying drawings, which show, for purpose of illustrations only, the preferred embodiments in accordance with the present invention.

DETAILED DESCRIPTION

First Embodiment

Figure 1A:
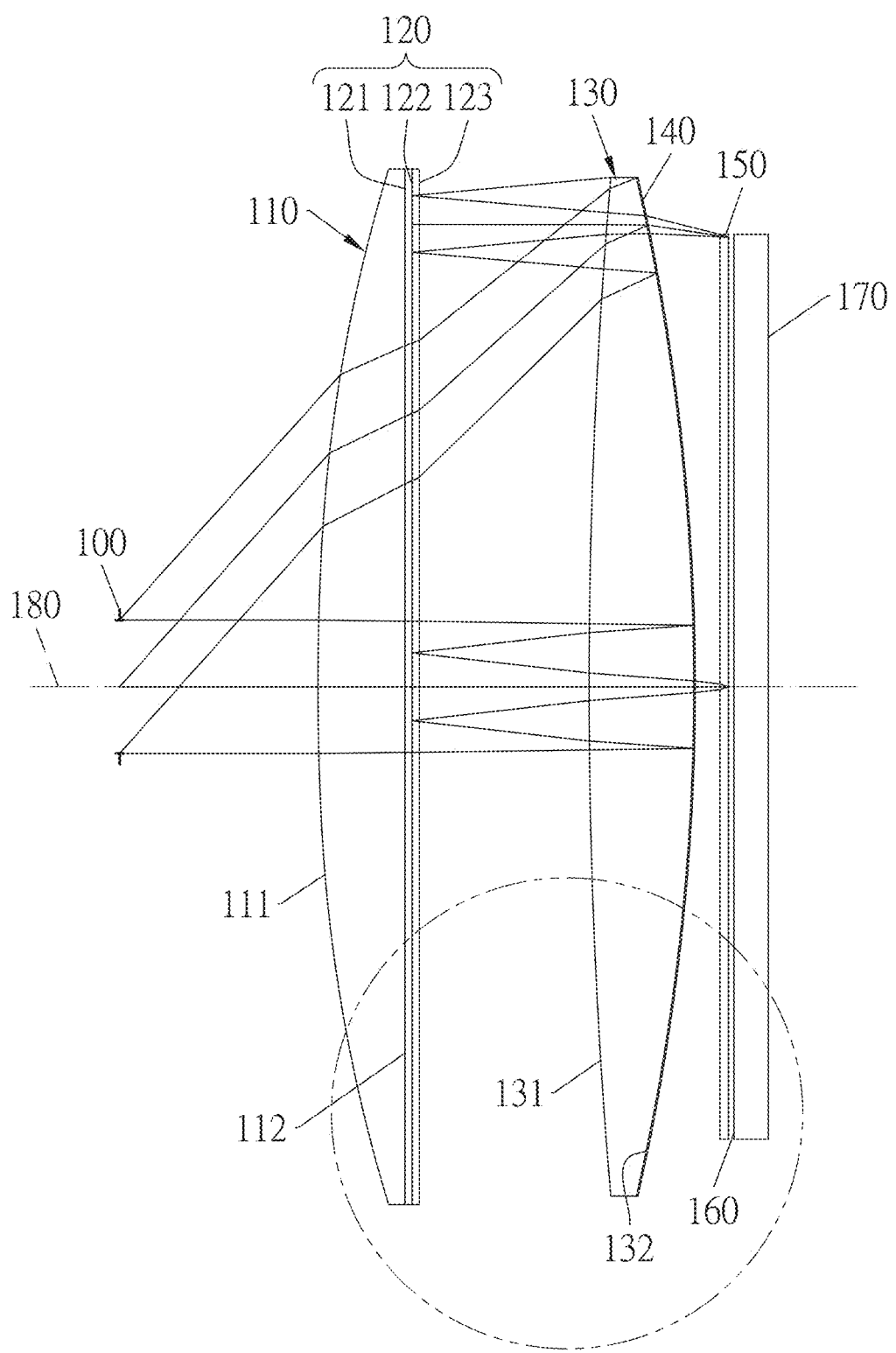
FIG. 1A shows an optical lens assembly in accordance with a first embodiment of the present invention.
Figure 1B:
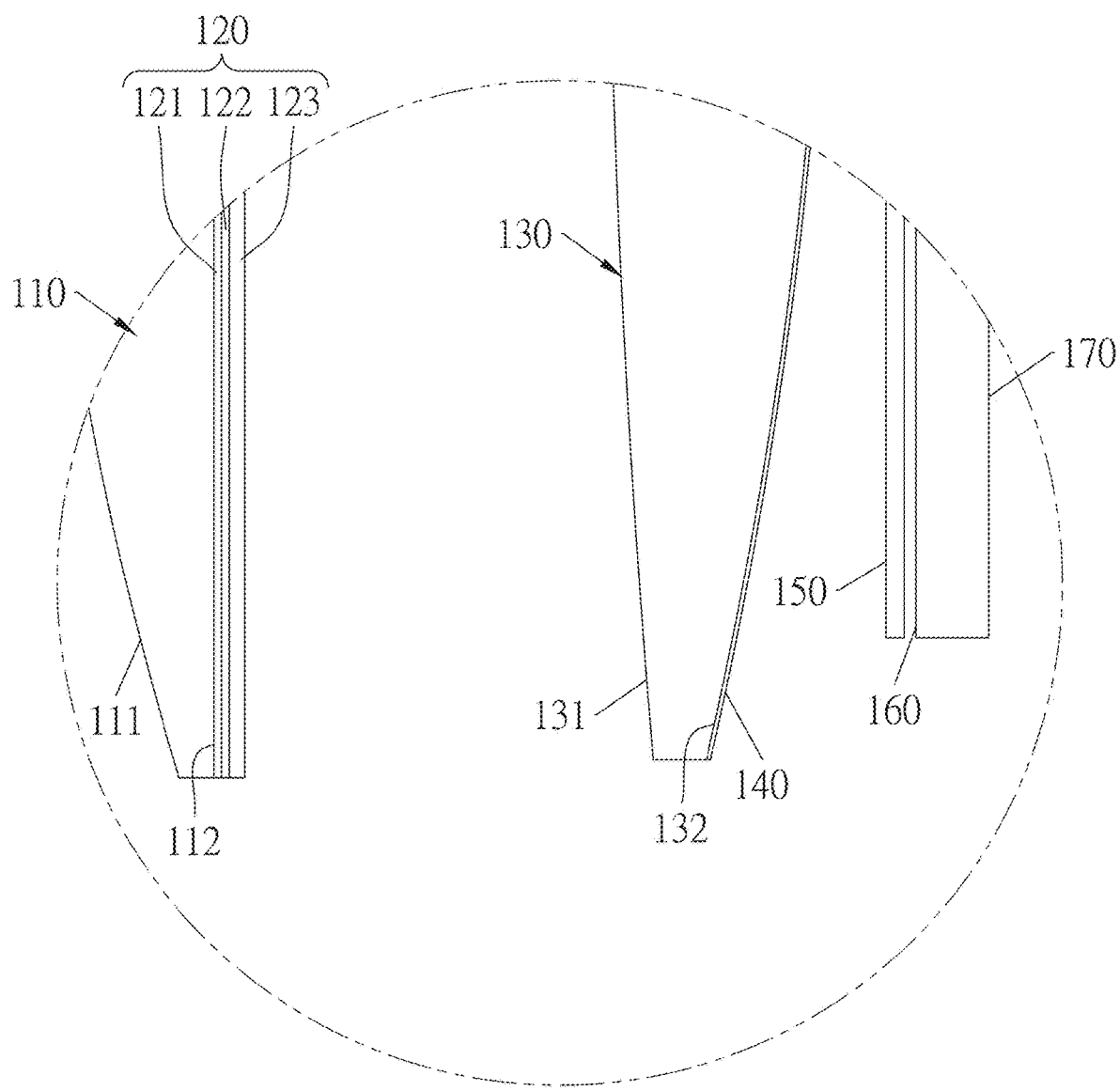
FIG. 1B shows a partial enlarged view of FIG. 1A.
Figure 10:
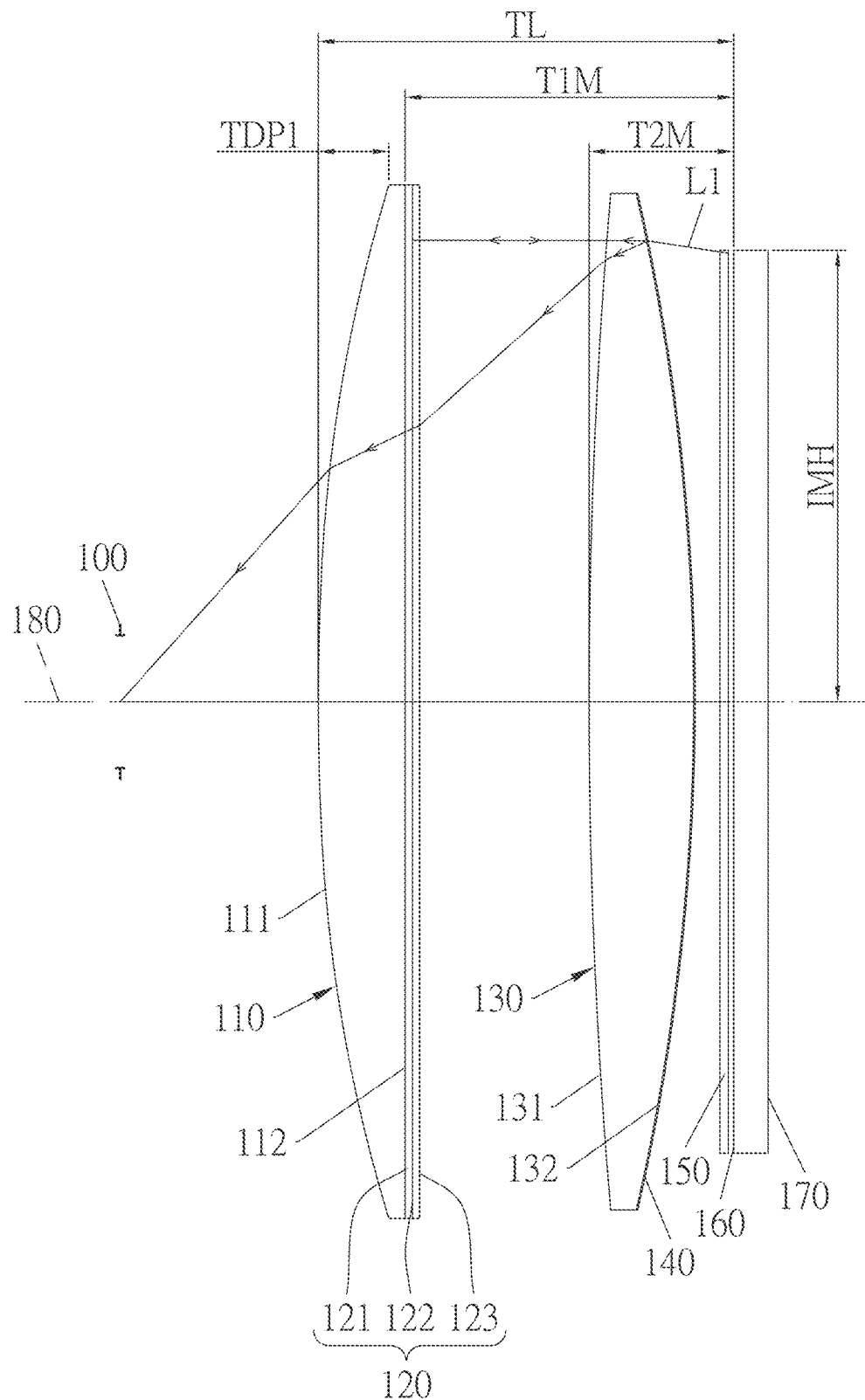
FIG. 10 shows parameters and a light path in accordance with the first embodiment of the present invention.

Referring to FIGS. 1A, 1B and 10, FIG. 1A shows an optical lens assembly in accordance with a first embodiment of the present invention, FIG. 1B shows a partial enlarged view of FIG. 1A, and FIG. 10 shows the parameters and a light path of the first embodiment of the present invention. The optical lens assembly includes, in order from a visual side to an image source side along an optical axis 180: a stop 100, a first lens 110, an optical element 120, a second lens 130, a partial-reflective-partial-transmissive element 140, a second phase retarder 150, and an image source plane 160. The optical lens assembly has a total of two lenses with refractive power, but is not limited thereto. The optical lens assembly works in cooperation with an image source 170. The image source plane 160 can be located at the image source 170. The type of the image source 170 may be a liquid crystal display, an OLED display, or a LED display, but is not limited thereto. The stop 100 may be at where the user's eyes view the virtual image.

The first lens 110 with positive refractive power includes a visual-side surface 111 and an image source-side surface 112, the visual-side surface 111 of the first lens 110 is convex in a paraxial region thereof, the image source-side surface 112 of the first lens 110 is flat in a paraxial region thereof, and the visual-side surface 111 of the first lens 110 is aspheric.

The optical element 120 includes, in order from the visual side to the image source side, an absorptive polarizer 121, a reflective polarizer 122 and a first phase retarder 123. These three elements may be stacked (for example, but not limited to, by film stickers) on the image source-side surface 112 of the first lens 110, and the opposite two surfaces of each of these three elements are flat. Specifically, the absorptive polarizer 121 is attached to the image source-side surface 112, the reflective polarizer 122 is attached to the absorptive polarizer 121, and the first phase retarder 123 is attached to the reflective polarizer 122. The first phase retarder 123 is, for example, but not limited to, a quarter-wave plate.

The second lens 130 with positive refractive power includes a visual-side surface 131 and an image source-side surface 132, the visual-side surface 131 of the second lens 130 is convex in a paraxial region thereof, the image source-side surface 132 of the second lens 130 is convex in a paraxial region thereof, the visual-side surface 131 of the second lens 130 is spherical, and the image source-side surface 132 of the second lens 130 is aspheric.

The partial-reflective-partial-transmissive element 140 is disposed (for example, but not limited to, by coating) on the image source-side surface 132 of the second lens 130 and has an average light reflectance of at least 30%, preferably 50%, in the visible light range. The average light reflectance here is an average value of different reflectance of the partial-reflective-partial-transmissive element 140 for different wavelengths.

The second phase retarder 150 is disposed between the partial-reflective-partial-transmissive element 140 and the image source plane 160 and is closer to the image source plane 160. The second phase retarder 150 is, for example, but not limited to, a quarter-wave plate.

The equation for the aspheric surface profiles of the respective lenses of the first embodiment is expressed as follows:

$$z(h) = \frac{ch^2}{1 + [1 - (k+1)c^2h^2]^{0.5}} + \sum (A_i) \cdot (h^i)$$

wherein:
- z represents the value of a reference position at a height of h with respect to a vertex of the surface of a lens along the optical axis 180;
- c represents a paraxial curvature equal to 1/R (R: a paraxial radius of curvature);
- h represents a vertical distance from the point on the curve of the aspheric surface to the optical axis 180;
- k represents the conic constant; and
- $A_i$ represents the ith-order aspheric coefficient.

In the first embodiment of the present optical lens assembly, a focal length of the optical lens assembly is f, a focal length of the first lens 110 is f1, a focal length of the second lens 130 is f2, an entrance pupil diameter of the optical lens assembly is EPD, a f-number of the optical lens assembly is Fno, a maximum field of view of the optical lens assembly is FOV, a central thickness of the first lens 110 along the optical axis 180 is CT1, a central thickness of the second lens 130 along the optical axis 180 is CT2, a distance from the visual-side surface 131 of the second lens 130 to the image source plane 160 along the optical axis 180 is T2M, a distance from the image source-side surface 112 of the first lens 110 to the image source plane 160 along the optical axis 180 is T1M, a radius of curvature of the visual-side surface 111 of the first lens 110 is R1, a radius of curvature of the image source-side surface 112 of the first lens 110 is R2, a radius of curvature of the visual-side surface 131 of the second lens 130 is R3, a radius of curvature of the image source-side surface 132 of the second lens 130 is R4, a refractive index of the first lens 110 is nd1, a refractive index of the second lens 130 is nd2, an Abbe number of the first lens 110 is vd1, an Abbe number of the second lens 130 is vd2, a distance from the visual-side surface 111 of the first lens 110 to the image source plane 160 along the optical axis 180 is TL, a maximum image-source height of the optical lens assembly is IMH (usually denotes the radius of the incircle of the image source plane 160), a displacement in parallel to the optical axis 180 from an intersection between the visual-side surface 111 of the first lens 110 and the optical axis 180 to a maximum effective radius position on the visual-side surface 111 of the first lens 110 is TDP1, and the numerical values of these parameters are shown in Table 1.

TABLE 1

| f(mm) | 34.55 | R2(mm) | infinity |
|---|---|---|---|
| f1(mm) | 315.91 | R3(mm) | 355.231 |
| f2(mm) | 173.64 | R4(mm) | −128.431 |
| EPD(mm) | 8.00 | nd1 | 1.544 |
| Fno | 4.32 | nd2 | 1.544 |
| FOV(degrees) | 95.0 | vd1 | 55.9 |
| CT1(mm) | 5.209 | vd2 | 55.9 |
| CT2(mm) | 6.403 | TL(mm) | 24.368 |
| T2M(mm) | 7.903 | IMH(mm) | 26.940 |
| T1M(mm) | 19.159 | TDP1(mm) | 1.259 |
| R1(mm) | 172.415 | — | — |

In the first embodiment of the present optical lens assembly, the focal length of the optical lens assembly is f, the maximum image-source height of the optical lens assembly is IMH, and the following condition is satisfied: IMH/f=0.78.

In the first embodiment of the present optical lens assembly, the focal length of the first lens 110 is f1, the focal length of the second lens 130 is f2, and the following condition is satisfied: f1f=0.55.

In the first embodiment of the present optical lens assembly, the central thickness of the first lens 110 along the optical axis 180 is CT1, the central thickness of the second lens 130 along the optical axis 180 is CT2, and the following condition is satisfied: CT2/CT1=1.23.

In the first embodiment of the present optical lens assembly, the central thickness of the first lens 110 along the optical axis 180 is CT1, the displacement in parallel to the optical axis 180 from the intersection between the visual-side surface 111 of the first lens 110 and the optical axis 180 to the maximum effective radius position on the visual-side surface 111 of the first lens 110 is TDP1, and the following condition is satisfied: CT1/TDP1=4.14.

In the first embodiment of the present optical lens assembly, the focal length of the optical lens assembly is f, the focal length of the first lens 110 is f1, and the following condition is satisfied: f/f1=0.11.

In the first embodiment of the present optical lens assembly, the radius of curvature of the visual-side surface 111 of the first lens 110 is R1, the focal length of the first lens 110 is f1, and the following condition is satisfied: R1/f1=0.55.

In the first embodiment of the present optical lens assembly, the focal length of the optical lens assembly is f, the focal length of the second lens 130 is f2, and the following condition is satisfied: f/f2=0.20.

In the first embodiment of the present optical lens assembly, the radius of curvature of the image source-side surface 132 of the second lens 130 is R4, the focal length of the second lens 130 is f2, and the following condition is satisfied: R4/f2=−0.74.

In the first embodiment of the present optical lens assembly, the distance from the visual-side surface 111 of the first lens 110 to the image source plane 160 along the optical axis 180 is TL, the radius of curvature of the visual-side surface 111 of the first lens 110 is R1, and the following condition is satisfied: R1/TL=7.08.

In the first embodiment of the present optical lens assembly, the Abbe number of the first lens 110 is vd1, the Abbe number of the second lens 130 is vd2, the refractive index of the first lens 110 is nd1, and the following condition is satisfied: (vd1*nd1)/vd2=1.54.

In the first embodiment of the present optical lens assembly, the radius of curvature of the visual-side surface 111 of the first lens 110 is R1, the radius of curvature of the image source-side surface 132 of the second lens 130 is R4, and the following condition is satisfied: R1/R4=−1.34.

In the first embodiment of the present optical lens assembly, the radius of curvature of the visual-side surface 131 of the second lens 130 is R3, the radius of curvature of the image source-side surface 132 of the second lens 130 is R4, and the following condition is satisfied: R4/R3=−0.36.

In the first embodiment of the present optical lens assembly, the distance from the visual-side surface 131 of the second lens 130 to the image source plane 160 along the optical axis 180 is T2M, the central thickness of the second lens 130 along the optical axis 180 is CT2, and the following condition is satisfied: T2M/CT2=1.23.

In the first embodiment of the present optical lens assembly, the distance from the visual-side surface 111 of the first lens 110 to the image source plane 160 along the optical axis 180 is TL, the maximum image-source height of the optical lens assembly is IMH, and the following condition is satisfied: TL/IMH=0.90.

In the first embodiment of the present optical lens assembly, the radius of curvature of the image source-side surface 132 of the second lens 130 is R4, the refractive index of the second lens 130 is nd2, and the following condition is satisfied: R4/nd2=−83.18 mm.

Moreover, the optical lens assembly of the first embodiment utilizes the configuration and arrangement of the partial-reflective-partial-transmissive element, the absorptive polarizer, the reflective polarizer, the phase retarders and the lenses to fold the light path thereof by the transmission and reflection of light to shorten the length of the optical lens assembly required for imaging without affecting the image quality. Referring to FIG. 10, the linearly-polarized incident light emitted by the image source 170 travels along a light path L1 to the eyes of the user. Specifically, the linearly-polarized incident light turns from the linearly polarized state to the circularly polarized state when passing through the second phase retarder 150, a portion of the circularly polarized incident light into the second lens 130 upon serving as a transmitted light component passing through the partial-reflective-partial-transmissive element 140, and is refracted by the second lens 130 to the first phase retarder 123. This transmitted light component turns from the circularly polarized state to the linearly polarized state to have a polarization direction parallel to the reflection axis of the reflective polarizer 122 when passing through the first phase retarder 123. This linearly-polarized transmitted light component is then reflected by the reflective polarizer 122 to pass through the first phase retarder 123 and return from the linearly polarized state to the circularly polarized state. Then, after the transmitted light component returning to the circularly polarized state passes through the second lens 130, a portion of the transmitted light component passing through the second lens 130 is reflected as a reflected light component by the partial-reflective-partial-transmissive element 140 back to the second lens 130, and this reflected light component travels to the first phase retarder 123 after passing through the second lens 130. The reflected light component turns from the circularly polarized state to the linearly polarized state to have a polarization direction perpendicular to the reflection axis of the reflective polarizer 122 when passing through the first phase retarder 123. Finally, the linearly-polarized reflected light is refracted to the user's eyes by the first lens 110 after passing through the reflective polarizer 122 and the absorptive polarizer 121 to travel to the first lens 110.

The detailed optical data of the respective elements in the optical lens assembly of the first embodiment is shown in Table 2, and the aspheric surface data of the lenses in the first embodiment is shown in Table 3.

TABLE 2

Embodiment 1
f = 34.55 mm, EPD = 8.00 mm, FOV = 95.0 deg.

| Surface | | Curvature Radius | Thickness/gap | Refractive Index (nd) | Abbe number (vd) | Focal length |
|---|---|---|---|---|---|---|
| 0 | | infinity | −2500.000 | — | — | — |
| 1 | Stop | infinity | 12.000 | — | — | — |
| 2 | First lens | 172.415 | 5.209 | 1.544 | 55.9 | 315.91 |
| 3 | Absorptive polarizer | infinity | 0.100 | 1.533 | 56.0 | — |
| 4 | Reflective polarizer | infinity | 0.100 | 1.533 | 56.0 | — |
| 5 | First phase retarder | infinity | 0.100 | 1.533 | 56.0 | — |
| 6 | | infinity | 10.856 | — | — | — |
| 7 | Second lens | 355.231 | 6.403 | 1.544 | 55.9 | — |
| 8 | Partial-reflective-partial-transmissive element | −128.431 | −6.403 | mirror | | — |
| 9 | | 355.231 | −10.856 | — | — | — |
| 10 | First phase retarder | infinity | −0.100 | 1.533 | 56.0 | — |
| 11 | Reflective polarizer | infinity | −0.100 | 1.533 | 56.0 | — |
| 12 | | infinity | 0.100 | mirror | | — |
| 13 | First phase retarder | infinity | 0.100 | 1.533 | 56.0 | — |
| 14 | | infinity | 10.856 | — | — | — |
| 15 | Second lens | 355.231 | 6.403 | 1.544 | 55.9 | 173.64 |
| 16 | | −128.431 | 1.500 | — | — | — |
| 17 | Second phase retarder | infinity | 0.100 | 1.533 | 56.0 | — |
| 18 | Image source plane | infinity | — | — | — | — |

Note:
the reference wavelength is 555 nm

TABLE 3

Aspheric Coefficients

| Surface | 2 | 8 | 16 |
|---|---|---|---|
| K: | −1.1349E−01 | −1.5392E+00 | −1.5392E+00 |
| A2: | 0.0000E+00 | 0.0000E+00 | 0.0000E+00 |
| A4: | 2.5103E−06 | 3.9001E−08 | 3.9001E−08 |
| A6: | 1.3651E−09 | 2.5879E−10 | 2.5879E−10 |
| A8: | −7.3781E−12 | −1.4892E−13 | −1.4892E−13 |
| A10: | 1.0427E−15 | 4.2838E−17 | 4.2838E−17 |
| A12: | 2.1329E−17 | 3.3944E−20 | 3.3944E−20 |
| A14: | −2.8095E−20 | 7.4731E−24 | 7.4731E−24 |
| A16: | 1.0632E−23 | −2.0824E−26 | −2.0824E−26 |
| A18: | 0.0000E+00 | 0.0000E+00 | 0.0000E+00 |
| A20: | 0.0000E+00 | 0.0000E+00 | 0.0000E+00 |

In Table 2, the units of the radius of curvature, the thickness and the focal length are expressed in mm, and the surface numbers 18-0 respectively represent the surfaces where light travels to, from the image source plane 160 to the stop 100, wherein the surface 0 represents a gap between the user's eye (or stop 100) and a virtual image along the optical axis 180, and the imaging position is farther away from the visual side than the image source plane 160; the surface 1 represents a gap between the stop 100 and the first lens 110 along the optical axis 180; the surfaces 2, 3 and 17 represent the thicknesses of the first lens 110, the absorptive polarizer 121 and the second phase retarder 150 along the optical axis 180, respectively; the surfaces 4, 11 and 12 represent the thickness of the reflective polarizer 122 along the optical axis 180; the surfaces 5, 10 and 13 represent the thicknesses of the first phase retarder 123 along the optical axis 180; the surface 6 represents a gap between the first phase retarder 123 and the second lens 130 along the optical axis 180; the surfaces 7 and 15 represent the thickness of the second lens 130 along the optical axis 180; the surface 8 represents the thickness of the partial-reflective-partial-transmissive element 140 along the optical axis 180 (negative sign represents light reflective transmission); the surface 9 represents a gap between the partial-reflective-partial-transmissive element 140 and the first phase retarder 123 along the optical axis 180 (negative sign represents light reflective transmission); the surface 14 represents a gap between the first phase retarder 123 and the second lens 130 along the optical axis 180; the surface 16 represents a gap between the second lens 130 and the second phase retarder 150 along the optical axis 180; and each of gaps and thicknesses expressed in a positive value in the table is indicative of a traveling direction of light toward the visual side, while each of the gaps and thicknesses expressed in negative values is indicative of a traveling direction toward the image source plane 160. The traveling direction of light may be shown according to the light path L1 of FIG. 10.

In table 3, k represents the conic constant of the equation of aspheric surface profiles, and A2, A4, A6, A8, A10, A12, A14, A16, A18, and A20 represent the high-order aspheric coefficients.

The respective tables presented below for respective one of other embodiments are based on the schematic view of this embodiment, and the definitions of parameters in the tables are the same as those in Tables 1-3 of the first embodiment. Therefore, an explanation in this regard will not be provided again. Moreover, in each of the embodiments of the present invention, the maximum effective radius of either of surfaces of one lens is usually a vertical distance between an intersection of a ray, passing through the edge of the entrance pupil, in the incident light at a maximum view angle of the optical lens assembly and the surface of the lens and the optical axis, or is a radius of a part of the surface of the lens which is not subjected to any surface treatment (e.g., forming a concave and convex structure, or performing ink coating, etc. on the surface of the lens), or a radius of a light-transmissive part of the lens (as a shield or spacing ring, etc. blocks another part of the lens), but not limited thereto.

Second Embodiment

Figure 2:
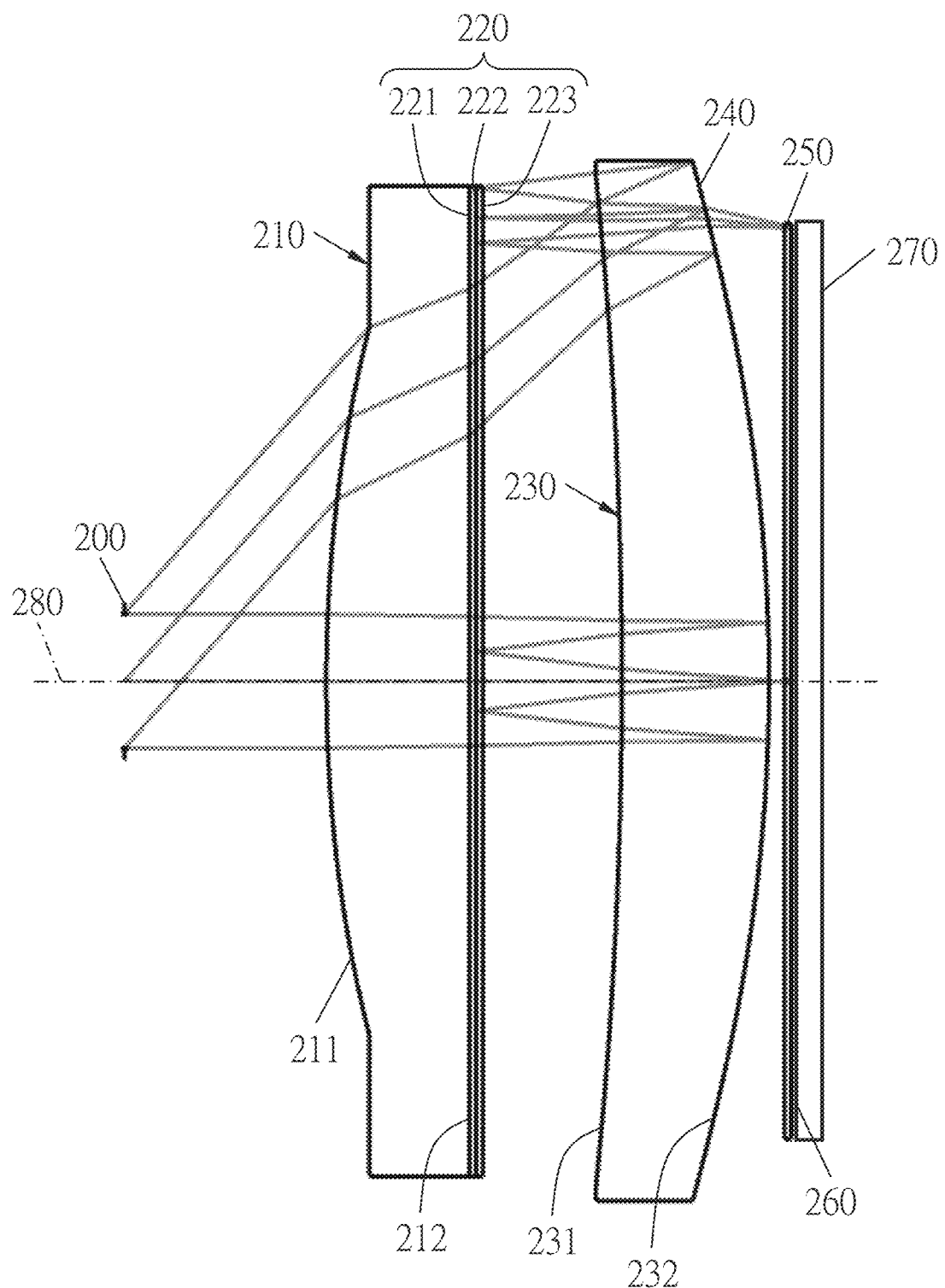
FIG. 2 shows an optical lens assembly in accordance with a second embodiment of the present invention.

Referring to FIG. 2 showing an optical lens assembly in accordance with a second embodiment of the present invention, the optical lens assembly in accordance with the second embodiment of the present invention includes, in order from a visual side to an image source side along an optical axis 280: a stop 200, a first lens 210, an optical element 220, a second lens 230, a partial-reflective-partial-transmissive element 240, a second phase retarder 250, and an image source plane 260. The optical lens assembly has a total of two lenses with refractive power but is not limited thereto. The optical lens assembly works in cooperation with an image source 270. The image source plane 260 can be located at the image source 270. The image source 270 may be a liquid crystal display, an OLED display, or a LED display, but is not limited thereto. The position of the stop 200 may be that where the user's eyes view the image.

The first lens 210 with positive refractive power includes a visual-side surface 211 and an image source-side surface 212, the visual-side surface 211 of the first lens 210 is convex in a paraxial region thereof, the image source-side surface 212 of the first lens 210 is flat in a paraxial region thereof, and the visual-side surface 211 of the first lens 210 is aspheric.

The optical element 220 comprises, in order from the visual side to the image source side: an absorptive polarizer 221, a reflective polarizer 222 and a first phase retarder 223. These three elements may be stacked (e.g. but not limited to film) on the image source-side surface 212 of the first lens 210, and the opposite two surfaces of the elements are flat. Specifically, the absorptive polarizer 221 is attached to the image source-side surface 212, the reflective polarizer 222 is attached to the absorptive polarizer 221, and the first phase retarder 223 is attached to the reflective polarizer 222. The first phase retarder 223 is for example but not limited to a quarter-wave plate.

The second lens 230 with positive refractive power includes a visual-side surface 231 and an image source-side surface 232, the visual-side surface 231 of the second lens 230 is concave in a paraxial region thereof, the image source-side surface 232 of the second lens 230 is convex in a paraxial region thereof, the visual-side surface 231 of the second lens 230 is spherical, and the image source-side surface 232 of the second lens 230 is aspheric.

The partial-reflective-partial-transmissive element 240 is disposed (e.g. but not limited to coating film) on the image source-side surface 232 of the second lens 230 and has an average light reflectance of at least 30% in the visible light range, preferably 50% average light reflectance. The average light reflectance here refers to the average value of the reflectance of the partial-reflective-partial-transmissive element 240 for different wavelengths.

The second phase retarder 250 is disposed between the partial-reflective-partial-transmissive element 240 and the image source plane 260 and near the image source plane 260. The second phase retarder 250 is for example but not limited to a quarter-wave plate.

The detailed data of the second embodiment is shown in Tables 4-7.

TABLE 4

Embodiment 2
f = 33.53 mm, EPD = 8.00 mm, FOV = 100.6 deg.

| Surface | | Curvature Radius | Thickness/ gap | Index (nd) | Abbe # (vd) | Effective focal length (EFL) |
|---|---|---|---|---|---|---|
| 0 | | Infinity | −2500.000 | — | — | — |
| 1 | Stop | Infinity | 12.000 | — | — | — |
| 2 | First lens | 91.925 | 8.500 | 1.544 | 55.9 | 168.43 |
| 3 | Absorptive polarizer | Infinity | 0.100 | 1.533 | 56.0 | — |
| 4 | Reflective polarizer | Infinity | 0.100 | 1.533 | 56.0 | — |
| 5 | First phase retarder | Infinity | 0.100 | 1.533 | 56.0 | — |
| 6 | | Infinity | 7.969 | — | — | — |
| 7 | Second lens | −293.204 | 8.749 | 1.544 | 55.9 | — |
| 8 | Partial-reflective-partial-transmissive element | −102.220 | −8.749 | mirror | | — |
| 9 | | −293.204 | −7.969 | — | — | — |
| 10 | First phase retarder | Infinity | −0.100 | 1.533 | 56.0 | — |
| 11 | Reflective polarizer | Infinity | −0.100 | 1.533 | 56.0 | — |
| 12 | | Infinity | 0.100 | mirror | | — |
| 13 | First phase retarder | Infinity | 0.100 | 1.533 | 56.0 | — |
| 14 | | Infinity | 7.969 | — | — | — |
| 15 | Second lens | −293.204 | 8.749 | 1.544 | 55.9 | 282.96 |
| 16 | | −102.220 | 1.240 | — | — | — |
| 17 | Second phase retarder | Infinity | 0.100 | 1.533 | 56.0 | — |
| 18 | Image source plane | Infinity | — | — | — | — |

Note:
the reference wavelength is 555 nm

TABLE 5

Aspheric Coefficients

| Surface | 2 | 8 | 16 |
|---|---|---|---|
| K: | −3.9672E+00 | −3.1848E−01 | −3.1848E−01 |
| A2: | 0.0000E+00 | 0.0000E+00 | 0.0000E+00 |
| A4: | 8.7604E−07 | −8.9732E−08 | −8.9732E−08 |
| A6: | 2.6898E−09 | 3.3331E−10 | 3.3331E−10 |
| A8: | −6.2660E−12 | −7.1199E−14 | −7.1199E−14 |
| A10: | 7.0821E−17 | 5.8415E−17 | 5.8415E−17 |
| A12: | 1.7294E−17 | 5.9287E−20 | 5.9287E−20 |
| A14: | −2.1005E−20 | −1.3481E−24 | −1.3481E−24 |
| A16: | 7.4253E−24 | −5.2421E−26 | −5.2421E−26 |
| A18: | 0.0000E+00 | 0.0000E+00 | 0.0000E+00 |
| A20: | 0.0000E+00 | 0.0000E+00 | 0.0000E+00 |

TABLE 6

| | | | |
|---|---|---|---|
| f(mm) | 33.53 | R2(mm) | Infinity |
| f1(mm) | 168.43 | R3(mm) | −293.204 |
| f2(mm) | 282.96 | R4(mm) | −102.220 |
| EPD(mm) | 8.00 | nd1 | 1.544 |
| Fno | 4.19 | nd2 | 1.544 |
| FOV(deg.) | 100.6 | vd1 | 55.9 |
| CT1(mm) | 8.500 | vd2 | 55.9 |
| CT2(mm) | 8.749 | TL(mm) | 26.858 |
| T2M(mm) | 10.089 | IMH(mm) | 26.940 |
| T1M(mm) | 18.358 | TDP1(mm) | 2.740 |
| R1(mm) | 91.925 | — | — |

TABLE 7

| | | | |
|---|---|---|---|
| IMH/f | 0.80 | R1/TL | 3.42 |
| f2/f1 | 1.68 | (vd1*nd1)/vd2 | 1.54 |
| CT2/CT1 | 1.03 | R1/R4 | −0.90 |
| CT1/TDP1 | 3.10 | R4/R3 | 0.35 |
| f/f1 | 0.20 | T2M/CT2 | 1.15 |
| R1/f1 | 0.55 | TL/IMH | 1.00 |
| f/f2 | 0.12 | R4/nd2(mm) | −66.20 |
| R4/f2 | −0.36 | — | — |

In the second embodiment, the equation of the aspheric surface profiles of the aforementioned lenses is the same as the equation of the aspheric surface profiles of the aforementioned lenses in the first embodiment. The values of the parameters in Table 6 can be calculated from Tables 4 and 5. The values of the conditions in Table 7 can be calculated from Table 6.

Third Embodiment

Figure 3:
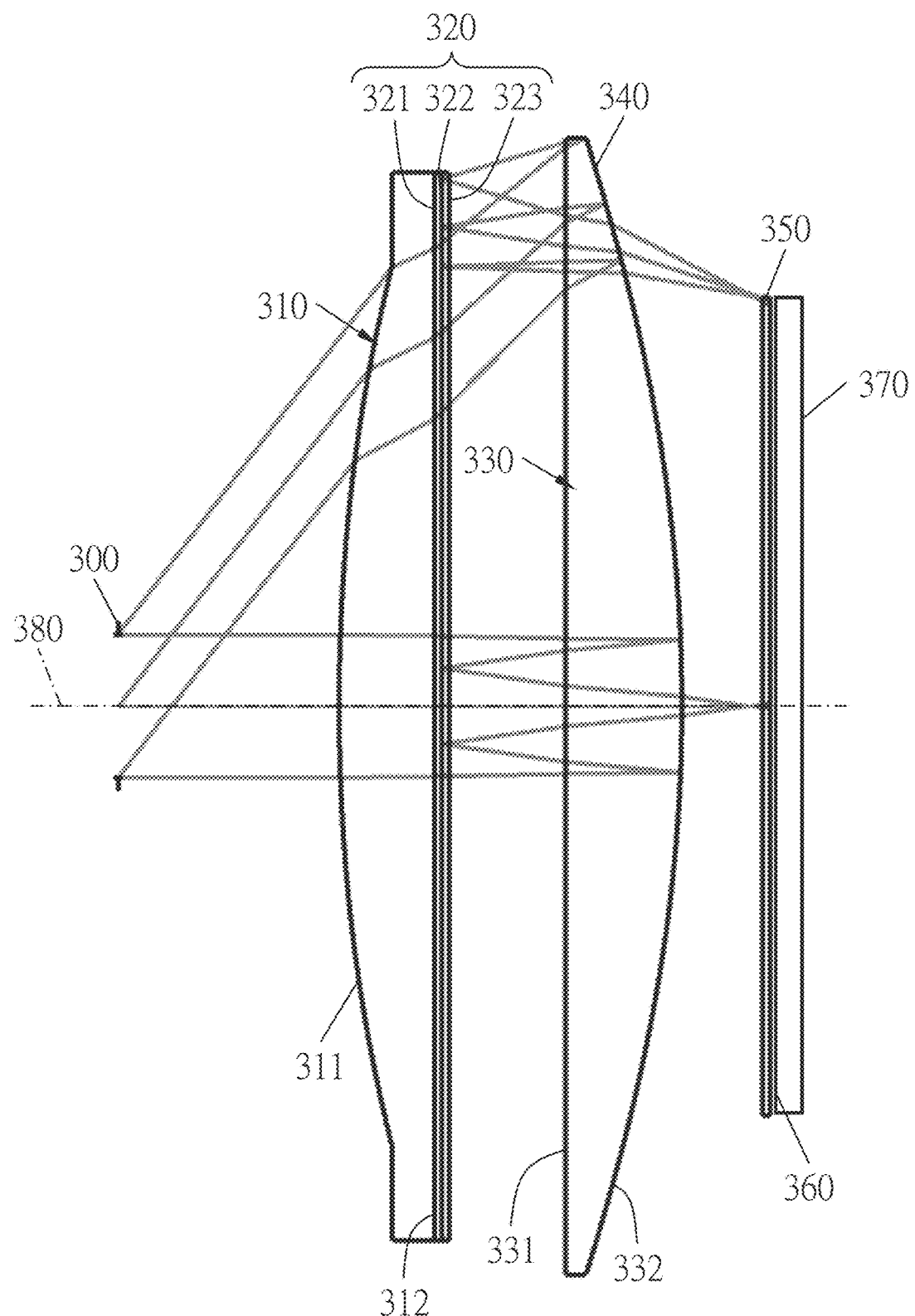
FIG. 3 shows an optical lens assembly in accordance with a third embodiment of the present invention.

Referring to FIG. 3 showing an optical lens assembly in accordance with a third embodiment of the present invention, the optical lens assembly in accordance with the third embodiment of the present invention includes, in order from a visual side to an image source side along an optical axis 380: a stop 300, a first lens 310, an optical element 320, a second lens 330, a partial-reflective-partial-transmissive element 340, a second phase retarder 350, and an image source plane 360. The optical lens assembly has a total of two lenses with refractive power but is not limited thereto. The optical lens assembly works in cooperation with an image source 370. The image source plane 360 can be located at the image source 370. The image source 370 may be a liquid crystal display, an OLED display, or a LED display, but is not limited thereto. The position of the stop 300 may be that where the user's eyes view the image.

The first lens 310 with positive refractive power includes a visual-side surface 311 and an image source-side surface 312, the visual-side surface 311 of the first lens 310 is convex in a paraxial region thereof, the image source-side surface 312 of the first lens 310 is flat in a paraxial region thereof, and the visual-side surface 311 of the first lens 310 is aspheric.

The optical element 320 comprises, in order from the visual side to the image source side: an absorptive polarizer 321, a reflective polarizer 322 and a first phase retarder 323. These three elements may be stacked (e.g. but not limited to film) on the image source-side surface 312 of the first lens 310, and the opposite two surfaces of the elements are flat. Specifically, the absorptive polarizer 321 is attached to the image source-side surface 312, the reflective polarizer 322 is attached to the absorptive polarizer 321, and the first phase retarder 323 is attached to the reflective polarizer 322. The first phase retarder 323 is for example but not limited to a quarter-wave plate.

The second lens 330 with positive refractive power includes a visual-side surface 331 and an image source-side surface 332, the visual-side surface 331 of the second lens 330 is flat in a paraxial region thereof, the image source-side surface 332 of the second lens 330 is convex in a paraxial region thereof, and the image source-side surface 332 of the second lens 330 is aspheric.

The partial-reflective-partial-transmissive element 340 is disposed (e.g. but not limited to coating film) on the image source-side surface 332 of the second lens 330 and has an average light reflectance of at least 30% in the visible light range, preferably 50% average light reflectance. The average light reflectance here refers to the average value of the reflectance of the partial-reflective-partial-transmissive element 340 for different wavelengths.

The second phase retarder 350 is disposed between the partial-reflective-partial-transmissive element 340 and the image source plane 360 and near the image source plane 360. The second phase retarder 350 is for example but not limited to a quarter-wave plate.

The detailed data of the third embodiment is shown in Tables 8-11.

TABLE 8

Embodiment 3
f = 26.64 mm, EPD = 8.00 mm, FOV = 110.0 deg.

| Surface | | Curvature Radius | Thickness/ gap | Index (nd) | Abbe # (vd) | Effective focal length (EFL) |
|---|---|---|---|---|---|---|
| 0 | | Infinity | −2500.000 | — | — | — |
| 1 | Stop | Infinity | 12.000 | — | — | — |
| 2 | First lens | 112.956 | 5.191 | 1.544 | 55.9 | 206.96 |
| 3 | Absorptive polarizer | Infinity | 0.100 | 1.533 | 56.0 | — |
| 4 | Reflective polarizer | Infinity | 0.100 | 1.533 | 56.0 | — |
| 5 | First phase retarder | Infinity | 0.100 | 1.533 | 56.0 | — |
| 6 | | Infinity | 5.900 | — | — | — |
| 7 | Second lens | Infinity | 6.333 | 1.544 | 55.9 | — |

TABLE 8-continued

Embodiment 3
f = 26.64 mm, EPD = 8.00 mm, FOV = 110.0 deg.

| Surface | | Curvature Radius | Thickness/gap | Index (nd) | Abbe # (vd) | Effective focal length (EFL) |
|---|---|---|---|---|---|---|
| 8 | Partial-reflective-partial-transmissive element | −91.149 | −6.333 | mirror | | — |
| 9 | | Infinity | −5.900 | — | — | — |
| 10 | First phase retarder | Infinity | −0.100 | 1.533 | 56.0 | — |
| 11 | Reflective polarizer | Infinity | −0.100 | 1.533 | 56.0 | — |
| 12 | | Infinity | 0.100 | mirror | | — |
| 13 | First phase retarder | Infinity | 0.100 | 1.533 | 56.0 | — |
| 14 | | Infinity | 5.900 | — | — | — |
| 15 | Second lens | Infinity | 6.333 | 1.544 | 55.9 | 167.01 |
| 16 | | −91.149 | 4.273 | — | — | — |
| 17 | Second phase retarder | Infinity | 0.100 | 1.533 | 56.0 | — |
| 18 | Image source plane | Infinity | — | — | — | — |

Note:
the reference wavelength is 555 nm

TABLE 9

Aspheric Coefficients

| Surface | 2 | 8 | 16 |
|---|---|---|---|
| K: | −3.2483E+00 | −4.9646E−01 | −4.9646E−01 |
| A2: | 0.0000E+00 | 0.0000E+00 | 0.0000E+00 |
| A4: | 4.9293E−07 | −9.8320E−08 | −9.8320E−08 |
| A6: | 7.2437E−09 | 1.0662E−09 | 1.0662E−09 |
| A8: | −2.3322E−11 | −1.0578E−12 | −1.0578E−12 |
| A10: | −1.0328E−14 | −6.2723E−17 | −6.2723E−17 |
| A12: | 1.6356E−16 | 6.1793E−19 | 6.1793E−19 |
| A14: | −2.6979E−19 | 2.3934E−22 | 2.3934E−22 |
| A16: | 1.3810E−22 | −3.8954E−25 | −3.8954E−25 |
| A18: | 0.0000E+00 | 0.0000E+00 | 0.0000E+00 |
| A20: | 0.0000E+00 | 0.0000E+00 | 0.0000E+00 |

TABLE 10

| f(mm) | 26.64 | R2(mm) | Infinity |
|---|---|---|---|
| f1(mm) | 206.96 | R3(mm) | Infinity |
| f2(mm) | 167.01 | R4(mm) | −91.149 |
| EPD(mm) | 8.00 | nd1 | 1.544 |
| Fno | 3.33 | nd2 | 1.544 |
| FOV(deg.) | 110.0 | vd1 | 55.9 |
| CT1(mm) | 5.191 | vd2 | 55.9 |
| CT2(mm) | 6.333 | TL(mm) | 22.197 |
| T2M(mm) | 10.706 | IMH(mm) | 22.450 |
| T1M(mm) | 17.006 | TDP1(mm) | 3.188 |
| R1(mm) | 112.956 | — | — |

TABLE 11

| IMH/f | 0.84 | R1/TL | 5.09 |
|---|---|---|---|
| f2/f1 | 0.81 | (vd1*nd1)/vd2 | 1.54 |
| CT2/CT1 | 1.22 | R1/R4 | −1.24 |
| CT1/TDP1 | 1.63 | R4/R3 | 0.00 |
| f/f1 | 0.13 | T2M/CT2 | 1.69 |
| R1/f1 | 0.55 | TL/IMH | 0.99 |
| f/f2 | 0.16 | R4/nd2(mm) | −59.03 |
| R4/f2 | −0.55 | — | — |

In the third embodiment, the equation of the aspheric surface profiles of the aforementioned lenses is the same as the equation of the aspheric surface profiles of the aforementioned lenses in the first embodiment. The values of the parameters in Table 10 can be calculated from Tables 8 and 9. The values of the conditions in Table 11 can be calculated from Table 10.

Fourth Embodiment

Figure 4:
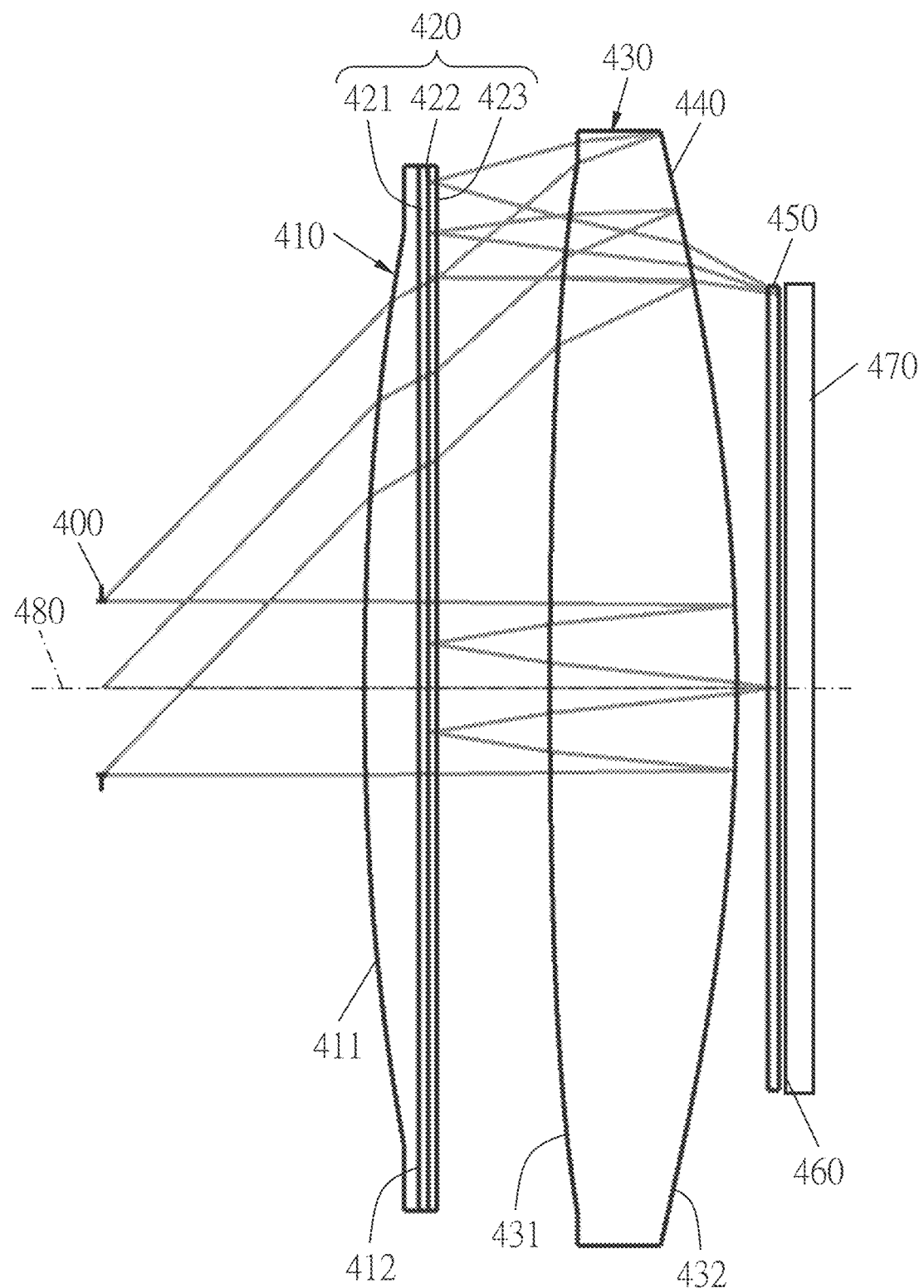
FIG. 4 shows an optical lens assembly in accordance with a fourth embodiment of the present invention.

Referring to FIG. 4, showing an optical lens assembly in accordance with a fourth embodiment of the present invention, the optical lens assembly in accordance with the fourth embodiment of the present invention includes, in order from a visual side to an image source side along an optical axis 480: a stop 400, a first lens 410, an optical element 420, a second lens 430, a partial-reflective-partial-transmissive element 440, a second phase retarder 450, and an image source plane 460. The optical lens assembly has a total of two lenses with refractive power but is not limited thereto. The optical lens assembly works in cooperation with an image source 470. The image source plane 460 can be located at the image source 470. The image source 470 may be a liquid crystal display, an OLED display, or a LED display, but is not limited thereto. The position of the stop 400 may be that where the user's eyes view the image.

The first lens 410 with positive refractive power includes a visual-side surface 411 and an image source-side surface 412, the visual-side surface 411 of the first lens 410 is convex in a paraxial region thereof, the image source-side surface 412 of the first lens 410 is flat in a paraxial region thereof, and the visual-side surface 411 of the first lens 410 is aspheric.

The optical element 420 comprises, in order from the visual side to the image source side: an absorptive polarizer 421, a reflective polarizer 422 and a first phase retarder 423. These three elements may be stacked (e.g. but not limited to film) on the image source-side surface 412 of the first lens 410, and the opposite two surfaces of the elements are flat. Specifically, the absorptive polarizer 421 is attached to the image source-side surface 412, the reflective polarizer 422 is attached to the absorptive polarizer 421, and the first phase retarder 423 is attached to the reflective polarizer 422. The first phase retarder 423 is for example but not limited to a quarter-wave plate.

The second lens 430 with positive refractive power includes a visual-side surface 431 and an image source-side surface 432, the visual-side surface 431 of the second lens 330 is convex in a paraxial region thereof, the image source-side surface 432 of the second lens 430 is convex in a paraxial region thereof, and the visual-side surface 431 and the image source-side surface 432 of the second lens 430 are aspheric.

The partial-reflective-partial-transmissive element 440 is disposed (e.g. but not limited to coating film) on the image source-side surface 432 of the second lens 430 and has an average light reflectance of at least 30% in the visible light range, preferably 50% average light reflectance. The average light reflectance here refers to the average value of the reflectance of the partial-reflective-partial-transmissive element 440 for different wavelengths.

The second phase retarder 450 is disposed between the partial-reflective-partial-transmissive element 440 and the image source plane 460 and near the image source plane 460. The second phase retarder 450 is for example but not limited to a quarter-wave plate.

The detailed data of the fourth embodiment is shown in Tables 12-15.

TABLE 12

Embodiment 4
f = 24.10 mm, EPD = 8.00 mm, FOV = 95.0 deg.

| Surface | | Curvature Radius | Thickness/gap | Index (nd) | Abbe # (vd) | Effective focal length (EFL) |
|---|---|---|---|---|---|---|
| 0 | | Infinity | −2500.000 | — | — | — |
| 1 | Stop | Infinity | 12.000 | — | — | — |
| 2 | First lens | 141.774 | 2.500 | 1.544 | 55.9 | 259.77 |
| 3 | Absorptive polarizer | Infinity | 0.100 | 1.533 | 56.0 | — |
| 4 | Reflective polarizer | Infinity | 0.100 | 1.533 | 56.0 | — |
| 5 | First phase retarder | Infinity | 0.100 | 1.533 | 56.0 | — |
| 6 | | Infinity | 4.778 | — | — | — |
| 7 | Second lens | 431.630 | 8.537 | 1.544 | 55.9 | — |
| 8 | Partial-reflective-partial-transmissive element | −84.521 | −8.537 | mirror | | — |
| 9 | | 431.630 | −4.778 | — | — | — |
| 10 | First phase retarder | Infinity | −0.100 | 1.533 | 56.0 | — |
| 11 | Reflective polarizer | Infinity | −0.100 | 1.533 | 56.0 | — |
| 12 | | Infinity | 0.100 | mirror | | — |
| 13 | First phase retarder | Infinity | 0.100 | 1.533 | 56.0 | — |
| 14 | | Infinity | 4.778 | — | — | — |
| 15 | Second lens | 431.630 | 8.537 | 1.544 | 55.9 | 130.27 |
| 16 | | −84.521 | 1.500 | — | — | — |
| 17 | Second phase retarder | Infinity | 0.100 | 1.533 | 56.0 | — |
| 18 | Image source plane | Infinity | — | — | — | — |

Note:
the reference wavelength is 555 nm

TABLE 13

Aspheric Coefficients

| Surface | 2 | 7 | 8 | 9 | 15 | 16 |
|---|---|---|---|---|---|---|
| K: | −7.7675E+01 | 0.0000E+00 | −1.2718E+00 | 0.0000E+00 | 0.0000E+00 | −1.2718E+00 |
| A2: | 0.0000E+00 | 0.0000E+00 | 0.0000E+00 | 0.0000E+00 | 0.0000E+00 | 0.0000E+00 |
| A4: | 3.3524E−06 | 1.4664E−06 | −2.6342E−07 | 1.4664E−06 | 1.4664E−06 | −2.6342E−07 |
| A6: | 2.4431E−08 | 5.8168E−10 | 3.2637E−09 | 5.8168E−10 | 5.8168E−10 | 3.2637E−09 |
| A8: | −1.2156E−10 | −1.1784E−13 | −3.7343E−12 | −1.1784E−13 | −1.1784E−13 | −3.7343E−12 |
| A10: | −9.3263E−14 | −1.5876E−16 | −2.7386E−16 | −1.5876E−16 | −1.5876E−16 | −2.7386E−16 |
| A12: | 1.9386E−15 | 2.6350E−19 | 4.0583E−18 | 2.6350E−19 | 2.6350E−19 | 4.0583E−18 |
| A14: | −4.8241E−18 | 7.6688E−22 | 8.3688E−22 | 7.6688E−22 | 7.6688E−22 | 8.3688E−22 |
| A16: | 3.8134E−21 | 0.0000E+00 | −3.1559E−24 | 0.0000E+00 | 0.0000E+00 | −3.1559E−24 |
| A18: | 0.0000E+00 | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 | 0.0000E+00 |

TABLE 14

| | | | |
|---|---|---|---|
| f(mm) | 24.10 | R2(mm) | Infinity |
| f1(mm) | 259.77 | R3(mm) | 431.630 |
| f2(mm) | 130.27 | R4(mm) | −84.521 |
| EPD(mm) | 8.00 | nd1 | 1.544 |
| Fno | 3.02 | nd2 | 1.544 |
| FOV(deg.) | 95.0 | vd1 | 55.9 |
| CT1(mm) | 2.500 | vd2 | 55.9 |
| CT2(mm) | 8.537 | TL(mm) | 17.715 |
| T2M(mm) | 10.037 | IMH(mm) | 17.950 |
| T1M(mm) | 15.215 | TDP1(mm) | 1.426 |
| R1(mm) | 141.774 | — | — |

TABLE 15

| | | | |
|---|---|---|---|
| IMH/f | 0.74 | R1/TL | 8.00 |
| f2/f1 | 0.50 | (vd1*nd1)/vd2 | 1.54 |
| CT2/CT1 | 3.41 | R1/R4 | −1.68 |
| CT1/TDP1 | 1.75 | R4/R3 | −0.20 |
| f/f1 | 0.09 | T2M/CT2 | 1.18 |
| R1/f1 | 0.55 | TL/IMH | 0.99 |
| f/f2 | 0.18 | R4/nd2(mm) | −54.74 |
| R4/f2 | −0.65 | — | — |

In the fourth embodiment, the equation of the aspheric surface profiles of the aforementioned lenses is the same as the equation of the aspheric surface profiles of the aforementioned lenses in the first embodiment. The values of the parameters in Table 14 can be calculated from Tables 12 and 13. The values of the conditions in Table 15 can be calculated from Table 14.

Fifth Embodiment

Figure 5:
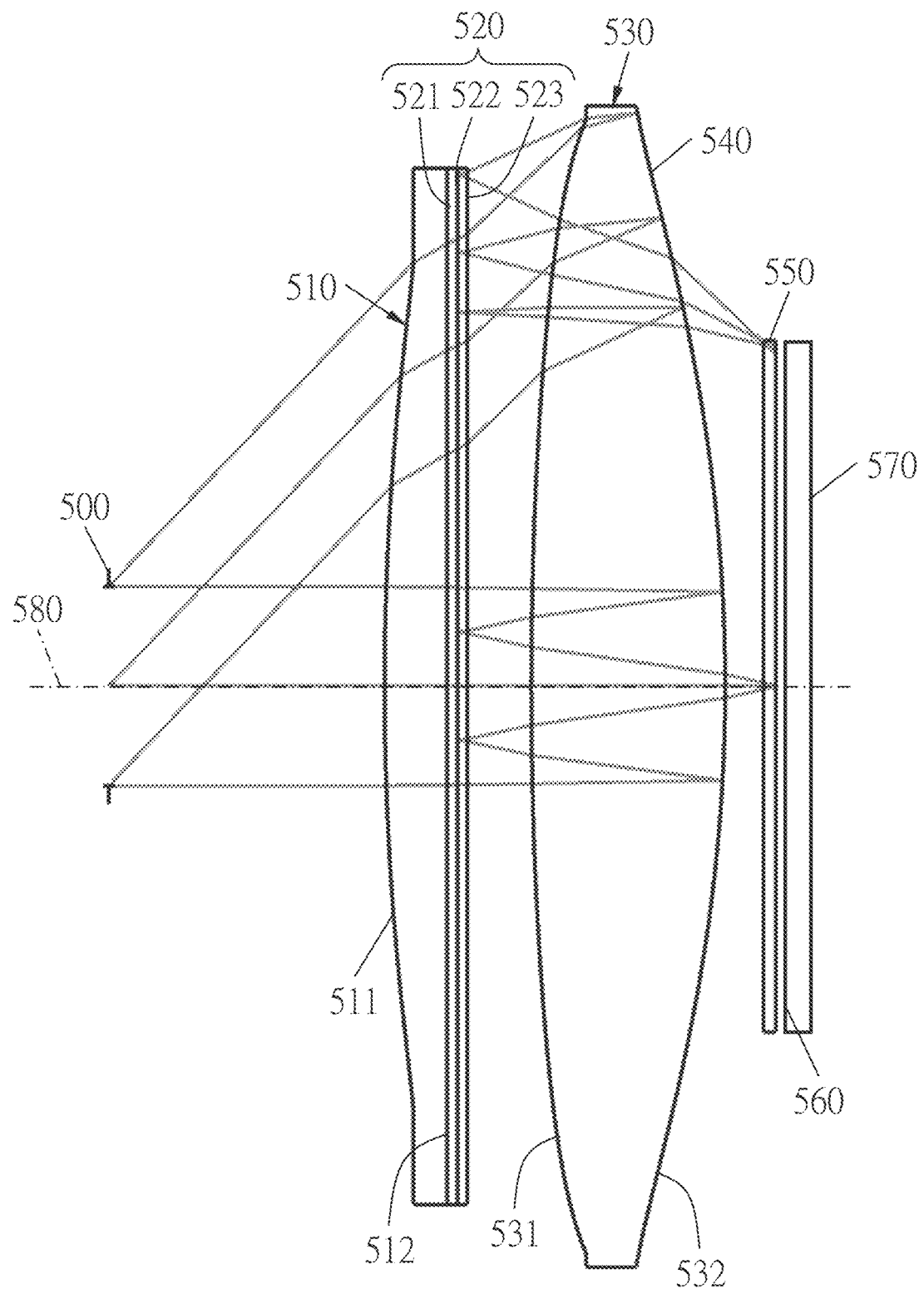
FIG. 5 shows an optical lens assembly in accordance with a fifth embodiment of the present invention.

Referring to FIG. 5, which shows an optical lens assembly in accordance with a fifth embodiment of the present invention, the optical lens assembly in accordance with the fifth embodiment of the present invention includes, in order from a visual side to an image source side along an optical axis 580: a stop 500, a first lens 510, an optical element 520, a second lens 530, a partial-reflective-partial-transmissive element 540, a second phase retarder 550, and an image source plane 560. The optical lens assembly has a total of two lenses with refractive power but is not limited thereto. The optical lens assembly works in cooperation with an image source 570. The image source plane 560 can be located at the image source 570. The image source 570 may be a liquid crystal display, an OLED display, or a LED display, but is not limited thereto. The position of the stop 500 may be that where the user's eyes view the image.

The first lens 510 with positive refractive power includes a visual-side surface 511 and an image source-side surface 512, the visual-side surface 511 of the first lens 410 is convex in a paraxial region thereof, the image source-side surface 512 of the first lens 510 is flat in a paraxial region thereof, and the visual-side surface 511 of the first lens 510 is aspheric.

The optical element 520 comprises, in order from the visual side to the image source side: an absorptive polarizer 521, a reflective polarizer 522 and a first phase retarder 523. These three elements may be stacked (e.g. but not limited to film) on the image source-side surface 512 of the first lens 510, and the opposite two surfaces of the elements are flat. Specifically, the absorptive polarizer 521 is attached to the image source-side surface 512, the reflective polarizer 522 is attached to the absorptive polarizer 521, and the first phase retarder 523 is attached to the reflective polarizer 522. The first phase retarder 523 is for example but not limited to a quarter-wave plate.

The second lens 530 with positive refractive power includes a visual-side surface 531 and an image source-side surface 532, the visual-side surface 531 of the second lens 530 is convex in a paraxial region thereof, the image source-side surface 532 of the second lens 530 is convex in a paraxial region thereof, and the visual-side surface 531 and the image source-side surface 532 of the second lens 530 are aspheric.

The partial-reflective-partial-transmissive element 540 is disposed (e.g. but not limited to coating film) on the image source-side surface 532 of the second lens 530 and has an average light reflectance of at least 30% in the visible light range, preferably 50% average light reflectance. The average light reflectance here refers to the average value of the reflectance of the partial-reflective-partial-transmissive element 540 for different wavelengths.

The second phase retarder 550 is disposed between the partial-reflective-partial-transmissive element 540 and the image source plane 560 and near the image source plane 560. The second phase retarder 550 is for example but not limited to a quarter-wave plate.

The detailed data of the fifth embodiment is shown in Tables 16-19.

TABLE 16

Embodiment 5
f = 18.16 mm, EPD = 8.00 mm, FOV = 95.0 deg.

| Surface | | Curvature Radius | Thickness/ gap | Index (nd) | Abbe # (vd) | Effective focal length (EFL) |
|---|---|---|---|---|---|---|
| 0 | | Infinity | −2500.000 | — | — | — |
| 1 | Stop | Infinity | 11.000 | — | — | — |
| 2 | First lens | 108.056 | 2.514 | 1.544 | 55.9 | 197.99 |
| 3 | Absorptive polarizer | Infinity | 0.100 | 1.533 | 56.0 | — |
| 4 | Reflective polarizer | Infinity | 0.100 | 1.533 | 56.0 | — |
| 5 | First phase retarder | Infinity | 0.100 | 1.533 | 56.0 | — |
| 6 | | Infinity | 2.545 | — | — | — |
| 7 | Second lens | 179.447 | 7.741 | 1.544 | 55.9 | — |
| 8 | Partial-reflective-partial-transmissive element | −67.226 | −7.741 | mirror | | — |
| 9 | | 179.447 | −2.545 | — | — | — |
| 10 | First phase retarder | Infinity | −0.100 | 1.533 | 56.0 | — |
| 11 | Reflective polarizer | Infinity | −0.100 | 1.533 | 56.0 | — |
| 12 | | Infinity | 0.100 | mirror | | — |
| 13 | First phase retarder | Infinity | 0.100 | 1.533 | 56.0 | — |

TABLE 16-continued

Embodiment 5
f = 18.16 mm, EPD = 8.00 mm, FOV = 95.0 deg.

| Surface | | Curvature Radius | Thickness/ gap | Index (nd) | Abbe # (vd) | Effective focal length (EFL) |
|---|---|---|---|---|---|---|
| 14 | | Infinity | 2.545 | — | — | — |
| 15 | Second lens | 179.447 | 7.741 | 1.544 | 55.9 | 90.61 |
| 16 | | −67.226 | 1.500 | — | — | — |
| 17 | Second phase retarder | Infinity | 0.100 | 1.533 | 56.0 | — |
| 18 | Image source plane | Infinity | — | — | — | — |

Note:
the reference wavelength is 555 nm

TABLE 17

Aspheric Coefficients

| Surface | 2 | 7 | 8 | 9 | 15 | 16 |
|---|---|---|---|---|---|---|
| K: | 1.1364E+01 | 0.0000E+00 | 2.0112E+00 | 0.0000E+00 | 0.0000E+00 | 2.0112E+00 |
| A2: | 0.0000E+00 | 0.0000E+00 | 0.0000E+00 | 0.0000E+00 | 0.0000E+00 | 0.0000E+00 |
| A4: | −1.1288E−05 | 1.4810E−06 | 8.0239E−07 | 1.4810E−06 | 1.4810E−06 | 8.0239E−07 |
| A6: | 1.1791E−07 | −4.1978E−09 | 4.8614E−09 | −4.1978E−09 | −4.1978E−09 | 4.8614E−09 |
| A8: | −4.5832E−10 | 7.3906E−12 | −6.2530E−12 | 7.3906E−12 | 7.3906E−12 | −6.2530E−12 |
| A10: | −1.3503E−12 | 1.2185E−14 | −4.1795E−17 | 1.2185E−14 | 1.2185E−14 | −4.1795E−17 |
| A12: | 1.6301E−14 | 3.9584E−18 | 1.9987E−17 | 3.9584E−18 | 3.9584E−18 | 1.9987E−17 |
| A14: | −4.8248E−17 | −5.2455E−21 | −4.4861E−21 | −5.2455E−21 | −5.2455E−21 | −4.4861E−21 |
| A16: | 4.8308E−20 | −5.2068E−24 | −7.0400E−25 | −5.2068E−24 | −5.2068E−24 | −7.0400E−25 |
| A18: | 0.0000E+00 | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 | 0.0000E+00 |

TABLE 18

| f(mm) | 18.16 | R2(mm) | Infinity |
|---|---|---|---|
| f1(mm) | 197.99 | R3(mm) | 179.447 |
| f2(mm) | 90.61 | R4(mm) | −67.226 |
| EPD(mm) | 8.00 | nd1 | 1.544 |
| Fno | 2.27 | nd2 | 1.544 |
| FOV(deg.) | 95.0 | vd1 | 55.9 |
| CT1(mm) | 2.514 | vd2 | 55.9 |
| CT2(mm) | 7.741 | TL(mm) | 14.700 |
| T2M(mm) | 9.241 | IMH(mm) | 13.470 |
| T1M(mm) | 12.186 | TDP1(mm) | 1.193 |
| R1(mm) | 108.056 | — | — |

TABLE 19

| IMH/f | 0.74 | R1/TL | 7.35 |
|---|---|---|---|
| f2/f1 | 0.46 | (vd1*nd1)/vd2 | 1.54 |
| CT2/CT1 | 3.08 | R1/R4 | −1.61 |
| CT1/TDP1 | 2.11 | R4/R3 | −0.37 |
| f/f1 | 0.09 | T2M/CT2 | 1.19 |
| R1/f1 | 0.55 | TL/IMH | 1.09 |
| f/f2 | 0.20 | R4/nd2(mm) | −43.54 |
| R4/f2 | −0.74 | — | — |

In the fifth embodiment, the equation of the aspheric surface profiles of the aforementioned lenses is the same as the equation of the aspheric surface profiles of the aforementioned lenses in the first embodiment. The values of the parameters in Table 18 can be calculated from Tables 16 and 17. The values of the conditions in Table 19 can be calculated from Table 18.

Sixth Embodiment

Figure 6:
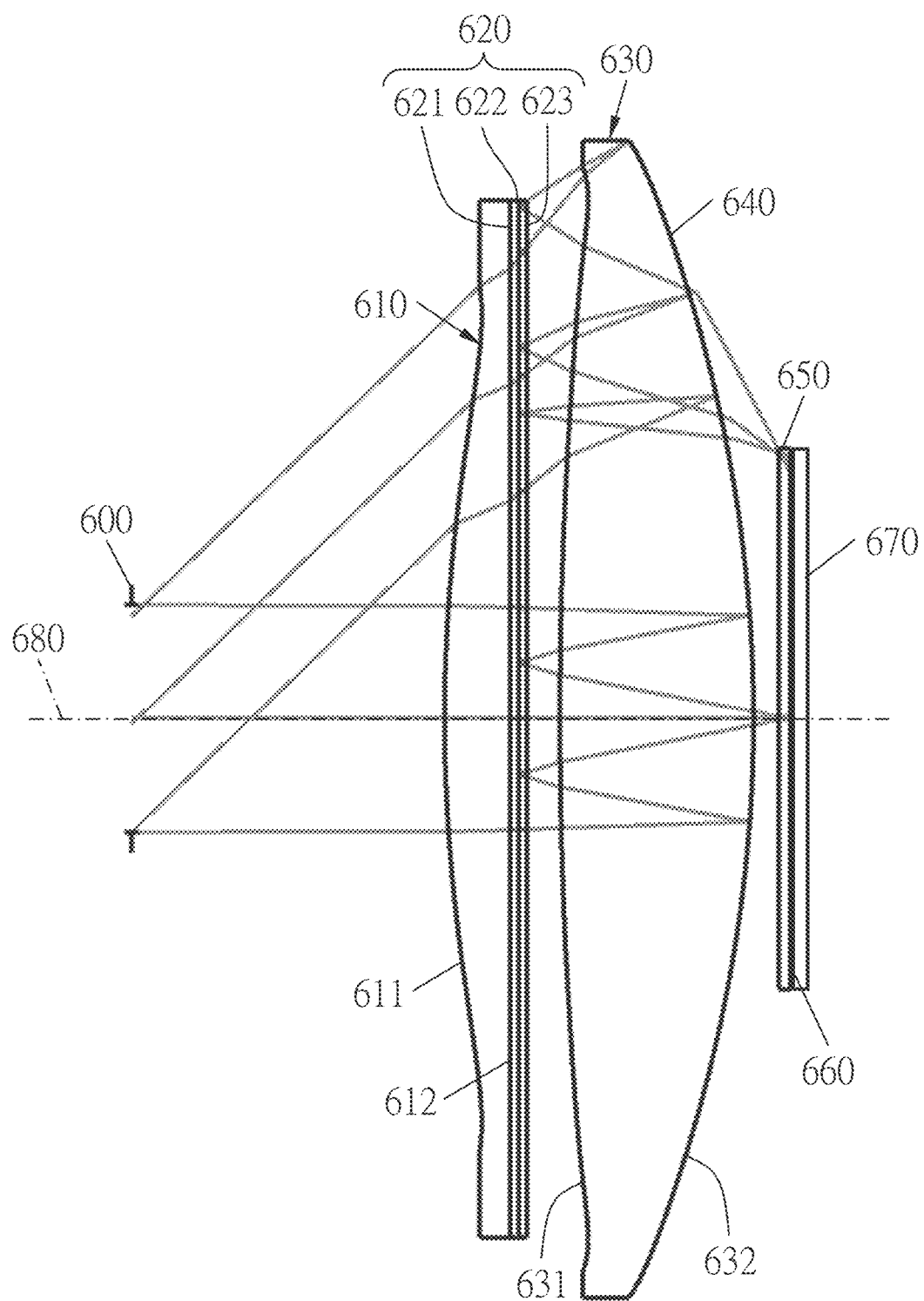
FIG. 6 shows an optical lens assembly in accordance with a sixth embodiment of the present invention.

Referring to FIG. 6, which shows an optical lens assembly in accordance with a sixth embodiment of the present invention, the optical lens assembly in accordance with the sixth embodiment of the present invention includes, in order from a visual side to an image source side along an optical axis 680: a stop 600, a first lens 610, an optical element 620, a second lens 630, a partial-reflective-partial-transmissive element 640, a second phase retarder 650, and an image source plane 660. The optical lens assembly has a total of two lenses with refractive power but is not limited thereto. The optical lens assembly works in cooperation with an image source 670. The image source plane 660 can be located at the image source 670. The image source 670 may be a liquid crystal display, an OLED display, or a LED display, but is not limited thereto. The position of the stop 600 may be that where the user's eyes view the image.

The first lens 610 with positive refractive power includes a visual-side surface 611 and an image source-side surface 612, the visual-side surface 611 of the first lens 610 is convex in a paraxial region thereof, the image source-side surface 612 of the first lens 610 is flat in a paraxial region thereof, and the visual-side surface 611 of the first lens 610 is aspheric.

The optical element 620 comprises, in order from the visual side to the image source side: an absorptive polarizer 621, a reflective polarizer 622 and a first phase retarder 623. These three elements may be stacked (e.g. but not limited to film) on the image source-side surface 612 of the first lens 610, and the opposite two surfaces of the elements are flat. Specifically, the absorptive polarizer 621 is attached to the image source-side surface 612, the reflective polarizer 622 is attached to the absorptive polarizer 621, and the first phase retarder 623 is attached to the reflective polarizer 622. The first phase retarder 623 is for example but not limited to a quarter-wave plate.

The second lens 630 with positive refractive power includes a visual-side surface 631 and an image source-side surface 632, the visual-side surface 631 of the second lens 630 is convex in a paraxial region thereof, the image source-side surface 632 of the second lens 630 is convex in a paraxial region thereof, and the visual-side surface 631 and the image source-side surface 632 of the second lens 630 are aspheric.

The partial-reflective-partial-transmissive element 640 is disposed (e.g. but not limited to coating film) on the image source-side surface 632 of the second lens 630 and has an average light reflectance of at least 30% in the visible light range, preferably 50% average light reflectance. The average light reflectance here refers to the average value of the reflectance of the partial-reflective-partial-transmissive element 640 for different wavelengths.

The second phase retarder 650 is disposed between the partial-reflective-partial-transmissive element 640 and the image source plane 660 and near the image source plane 660. The second phase retarder 650 is for example but not limited to a quarter-wave plate.

The detailed data of the sixth embodiment is shown in Tables 20-23.

TABLE 20

Embodiment 6
f = 13.41 mm, EPD = 8.00 mm, FOV = 85.0 deg.

| Surface | | Curvature Radius | Thickness/ gap | Index (nd) | Abbe # (vd) | Effective focal length (EFL) |
|---|---|---|---|---|---|---|
| 0 | | Infinity | −2500.000 | — | — | — |
| 1 | Stop | Infinity | 11.000 | — | — | — |
| 2 | First lens | 53.570 | 2.300 | 1.544 | 55.9 | 98.15 |
| 3 | Absorptive polarizer | Infinity | 0.100 | 1.533 | 56.0 | — |
| 4 | Reflective polarizer | Infinity | 0.100 | 1.533 | 56.0 | — |
| 5 | First phase retarder | Infinity | 0.100 | 1.533 | 56.0 | — |
| 6 | | Infinity | 0.856 | — | — | — |
| 7 | Second lens | 179.760 | 7.092 | 1.544 | 55.9 | — |
| 8 | Partial-reflective-partial-transmissive element | −49.127 | −7.092 | mirror | | — |
| 9 | | 179.760 | −0.856 | — | — | — |
| 10 | First phase retarder | Infinity | −0.100 | 1.533 | 56.0 | — |
| 11 | Reflective polarizer | Infinity | −0.100 | 1.533 | 56.0 | — |
| 12 | | Infinity | 0.100 | mirror | | — |
| 13 | First phase retarder | Infinity | 0.100 | 1.533 | 56.0 | — |
| 14 | | Infinity | 0.856 | — | — | — |
| 15 | Second lens | 179.760 | 7.092 | 1.544 | 55.9 | 71.48 |
| 16 | | −49.127 | 0.900 | — | — | — |
| 17 | Second phase retarder | Infinity | 0.100 | 1.533 | 56.0 | — |
| 18 | Image source plane | Infinity | — | — | — | — |

Note:
the reference wavelength is 555 nm

TABLE 21

Aspheric Coefficients

| Surface | 2 | 7 | 8 | 9 | 15 | 16 |
|---|---|---|---|---|---|---|
| K: | 4.5781E+00 | 0.0000E+00 | 2.8970E+00 | 0.0000E+00 | 0.0000E+00 | 2.8970E+00 |
| A2: | 0.0000E+00 | 0.0000E+00 | 0.0000E+00 | 0.0000E+00 | 0.0000E+00 | 0.0000E+00 |
| A4: | −3.3898E−05 | 6.7380E−06 | 3.3946E−06 | 6.7380E−06 | 6.7380E−06 | 3.3946E−06 |
| A6: | 4.0718E−07 | −4.2378E−08 | 1.8634E−08 | −4.2378E−08 | −4.2378E−08 | 1.8634E−08 |
| A8: | −2.2482E−09 | −1.3628E−11 | −5.8787E−11 | −1.3628E−11 | −1.3628E−11 | −5.8787E−11 |
| A10: | −1.2430E−11 | 3.5041E−13 | −3.2246E−14 | 3.5041E−13 | 3.5041E−13 | −3.2246E−14 |
| A12: | 1.9153E−13 | 1.0856E−15 | 2.7390E−16 | 1.0856E−15 | 1.0856E−15 | 2.7390E−16 |
| A14: | −8.0293E−16 | −4.1135E−18 | 1.1070E−18 | −4.1135E−18 | −4.1135E−18 | 1.1070E−18 |
| A16: | 1.1354E−18 | 0.0000E+00 | −2.9119E−21 | 0.0000E+00 | 0.0000E+00 | −2.9119E−21 |
| A18: | 0.0000E+00 | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 | 0.0000E+00 |

TABLE 22

| | | | |
|---|---|---|---|
| f(mm) | 13.41 | R2(mm) | Infinity |
| f1(mm) | 98.15 | R3(mm) | 179.760 |
| f2(mm) | 71.48 | R4(mm) | −49.127 |
| EPD(mm) | 8.00 | nd1 | 1.544 |
| Fno | 1.68 | nd2 | 1.544 |
| FOV(deg.) | 85.0 | vd1 | 55.9 |
| CT1(mm) | 2.300 | vd2 | 55.9 |
| CT2(mm) | 7.092 | TL(mm) | 11.547 |
| T2M(mm) | 8.092 | IMH(mm) | 8.980 |
| T1M(mm) | 9.247 | TDP1(mm) | 1.235 |
| R1(mm) | 53.570 | — | — |

TABLE 23

| | | | |
|---|---|---|---|
| IMH/f | 0.67 | R1/TL | 4.64 |
| f2/f1 | 0.73 | (vd1*nd1)/vd2 | 1.54 |
| CT2/CT1 | 3.08 | R1/R4 | −1.09 |
| CT1/TDP1 | 1.86 | R4/R3 | −0.27 |
| f/f1 | 0.14 | T2M/CT2 | 1.14 |
| R1/f1 | 0.55 | TL/IMH | 1.29 |
| f/f2 | 0.19 | R4/nd2(mm) | −31.82 |
| R4/f2 | −0.69 | — | — |

In the sixth embodiment, the equation of the aspheric surface profiles of the aforementioned lenses is the same as the equation of the aspheric surface profiles of the aforementioned lenses in the first embodiment. The values of the parameters in Table 22 can be calculated from Tables 20 and 21. The values of the conditions in Table 23 can be calculated from Table 22.

Seventh Embodiment

Figure 7:
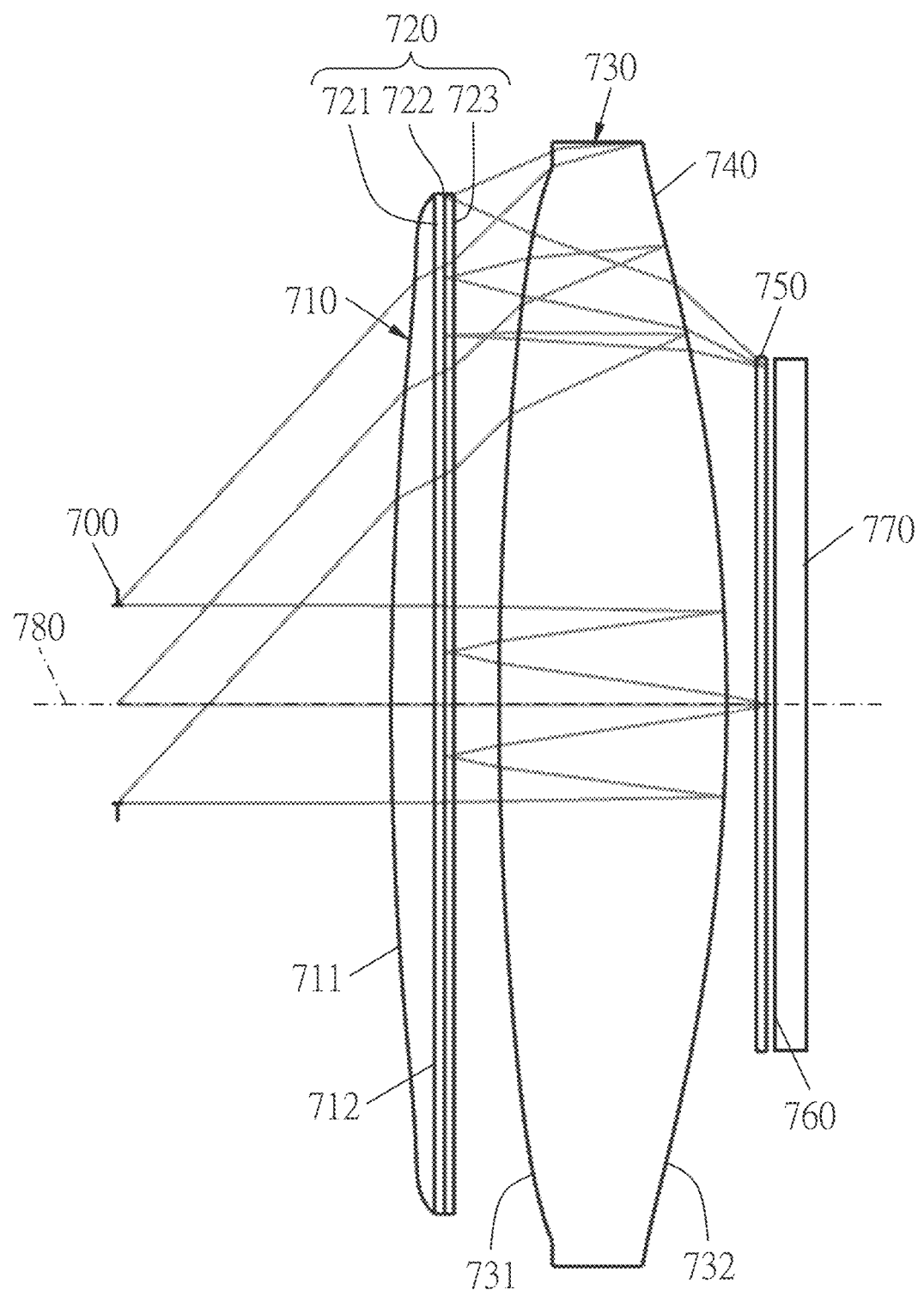
FIG. 7 shows an optical lens assembly in accordance with a seventh embodiment of the present invention.

Referring to FIG. 7, which shows an optical lens assembly in accordance with a seventh embodiment of the present invention, the optical lens assembly in accordance with the seventh embodiment of the present invention includes, in order from a visual side to an image source side along an optical axis 780: a stop 700, a first lens 710, an optical element 720, a second lens 730, a partial-reflective-partial-transmissive element 740, a second phase retarder 750, and an image source plane 760. The optical lens assembly has a total of two lenses with refractive power but is not limited thereto. The optical lens assembly works in cooperation with an image source 770. The image source plane 760 can be located at the image source 770. The image source 770 may be a liquid crystal display, an OLED display, or a LED display, but is not limited thereto. The position of the stop 700 may be that where the user's eyes view the image.

The first lens 710 with positive refractive power includes a visual-side surface 711 and an image source-side surface 712, the visual-side surface 711 of the first lens 710 is convex in a paraxial region thereof, the image source-side surface 712 of the first lens 710 is flat in a paraxial region thereof, and the visual-side surface 711 of the first lens 710 is aspheric.

The optical element 720 comprises, in order from the visual side to the image source side: an absorptive polarizer 721, a reflective polarizer 722 and a first phase retarder 723. These three elements may be stacked (e.g. but not limited to film) on the image source-side surface 712 of the first lens 710, and the opposite two surfaces of the elements are flat. Specifically, the absorptive polarizer 721 is attached to the image source-side surface 712, the reflective polarizer 722 is attached to the absorptive polarizer 721, and the first phase retarder 723 is attached to the reflective polarizer 722. The first phase retarder 723 is for example but not limited to a quarter-wave plate.

The second lens 730 with positive refractive power includes a visual-side surface 731 and an image source-side surface 732, the visual-side surface 731 of the second lens 730 is convex in a paraxial region thereof, the image source-side surface 732 of the second lens 730 is convex in a paraxial region thereof, and the visual-side surface 731 and the image source-side surface 732 of the second lens 730 are aspheric.

The partial-reflective-partial-transmissive element 740 is disposed (e.g. but not limited to coating film) on the image source-side surface 732 of the second lens 730 and has an average light reflectance of at least 30% in the visible light range, preferably 50% average light reflectance. The average light reflectance here refers to the average value of the reflectance of the partial-reflective-partial-transmissive element 740 for different wavelengths.

The second phase retarder 750 is disposed between the partial-reflective-partial-transmissive element 740 and the image source plane 760 and near the image source plane 760. The second phase retarder 750 is for example but not limited to a quarter-wave plate.

The detailed data of the seventh embodiment is shown in Tables 24-27.

TABLE 24

Embodiment 7
f = 18.11 mm, EPD = 8.00 mm, FOV = 95.0 deg.

| Surface | | Curvature Radius | Thickness/ gap | Index (nd) | Abbe # (vd) | Effective focal length (EFL) |
|---|---|---|---|---|---|---|
| 0 | | Infinity | −2500.000 | — | — | — |
| 1 | Stop | Infinity | 11.000 | — | — | — |
| 2 | First lens | 133.720 | 1.836 | 1.544 | 55.9 | 245.00 |
| 3 | Absorptive polarizer | Infinity | 0.100 | 1.533 | 56.0 | — |
| 4 | Reflective polarizer | Infinity | 0.100 | 1.533 | 56.0 | — |
| 5 | First phase retarder | Infinity | 0.100 | 1.533 | 56.0 | — |
| 6 | | Infinity | 1.720 | — | — | — |
| 7 | Second lens | 141.175 | 9.140 | 1.544 | 55.9 | — |
| 8 | Partial-reflective-partial-transmissive element | −68.412 | −9.140 | mirror | | — |
| 9 | | 141.175 | −1.720 | — | — | — |
| 10 | First phase retarder | Infinity | −0.100 | 1.533 | 56.0 | — |
| 11 | Reflective polarizer | Infinity | −0.100 | 1.533 | 56.0 | — |
| 12 | | Infinity | 0.100 | mirror | | — |
| 13 | First phase retarder | Infinity | 0.100 | 1.533 | 56.0 | — |

TABLE 24-continued

Embodiment 7
f = 18.11 mm, EPD = 8.00 mm, FOV = 95.0 deg.

| Surface | | Curvature Radius | Thickness/ gap | Index (nd) | Abbe # (vd) | Effective focal length (EFL) |
|---|---|---|---|---|---|---|
| 14 | | Infinity | 1.720 | — | | — |
| 15 | Second lens | 141.175 | 9.140 | 1.544 | 55.9 | 85.75 |
| 16 | | −68.412 | 1.500 | — | — | — |
| 17 | Second phase retarder | Infinity | 0.100 | 1.533 | 56.0 | — |
| 18 | Image source plane | Infinity | | | | |

Note:
the reference wavelength is 555 nm

TABLE 25

| Aspheric Coefficients | | | | | | |
|---|---|---|---|---|---|---|
| Surface | 2 | 7 | 8 | 9 | 15 | 16 |
| K: | 1.6276E+01 | 0.0000E+00 | 2.1582E+00 | 0.0000E+00 | 0.0000E+00 | 2.1582E+00 |
| A2: | 0.0000E+00 | 0.0000E+00 | 0.0000E+00 | 0.0000E+00 | 0.0000E+00 | 0.0000E+00 |
| A4: | −1.0016E−05 | 4.9293E−07 | 7.1946E−07 | 4.9293E−07 | 4.9293E−07 | 7.1946E−07 |
| A6: | 1.1487E−07 | −5.1330E−09 | 4.6281E−09 | −5.1330E−09 | −5.1330E−09 | 4.6281E−09 |
| A8: | −4.4084E−10 | 9.2049E−12 | −6.4740E−12 | 9.2049E−12 | 9.2049E−12 | −6.4740E−12 |
| A10: | −1.3708E−12 | 1.8251E−14 | 9.5439E−17 | 1.8251E−14 | 1.8251E−14 | 9.5439E−17 |
| A12: | 1.6180E−14 | 1.3892E−17 | 2.1307E−17 | 1.3892E−17 | 1.3892E−17 | 2.1307E−17 |
| A14: | −4.8146E−17 | 1.7467E−22 | −1.7817E−21 | 1.7467E−22 | 1.7467E−22 | −1.7817E−21 |
| A16: | 4.8581E−20 | −4.4598E−23 | 2.4932E−24 | −4.4598E−23 | −4.4598E−23 | 2.4932E−24 |
| A18: | 0.0000E+00 | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 | 0.0000E+00 |

TABLE 26

| f(mm) | 18.11 | R2(mm) | Infinity |
|---|---|---|---|
| f1(mm) | 245.01 | R3(mm) | 141.175 |
| f2(mm) | 85.75 | R4(mm) | −68.412 |
| EPD(mm) | 8.00 | nd1 | 1.544 |
| Fno | 2.27 | nd2 | 1.544 |
| FOV(deg.) | 95.0 | vd1 | 55.9 |
| CT1(mm) | 1.836 | vd2 | 55.9 |
| CT2(mm) | 9.140 | TL(mm) | 14.596 |
| T2M(mm) | 10.640 | IMH(mm) | 13.470 |
| T1M(mm) | 12.760 | TDP1(mm) | 0.952 |
| R1(mm) | 133.720 | — | — |

TABLE 27

| IMH/f | 0.74 | R1/TL | 9.16 |
|---|---|---|---|
| f2/f1 | 0.35 | (vd1*nd1)/vd2 | 1.54 |
| CT2/CT1 | 4.98 | R1/R4 | −1.95 |
| CT1/TDP1 | 1.93 | R4/R3 | −0.48 |
| f/f1 | 0.07 | T2M/CT2 | 1.16 |
| R1/f1 | 0.55 | TL/IMH | 1.08 |
| f/f2 | 0.21 | R4/nd2(mm) | −44.31 |
| R4/f2 | −0.80 | — | — |

In the seventh embodiment, the equation of the aspheric surface profiles of the aforementioned lenses is the same as the equation of the aspheric surface profiles of the aforementioned lenses in the first embodiment. The values of the parameters in Table 26 can be calculated from Tables 24 and 25. The values of the conditions in Table 27 can be calculated from Table 26.

Eighth Embodiment

Figure 8:
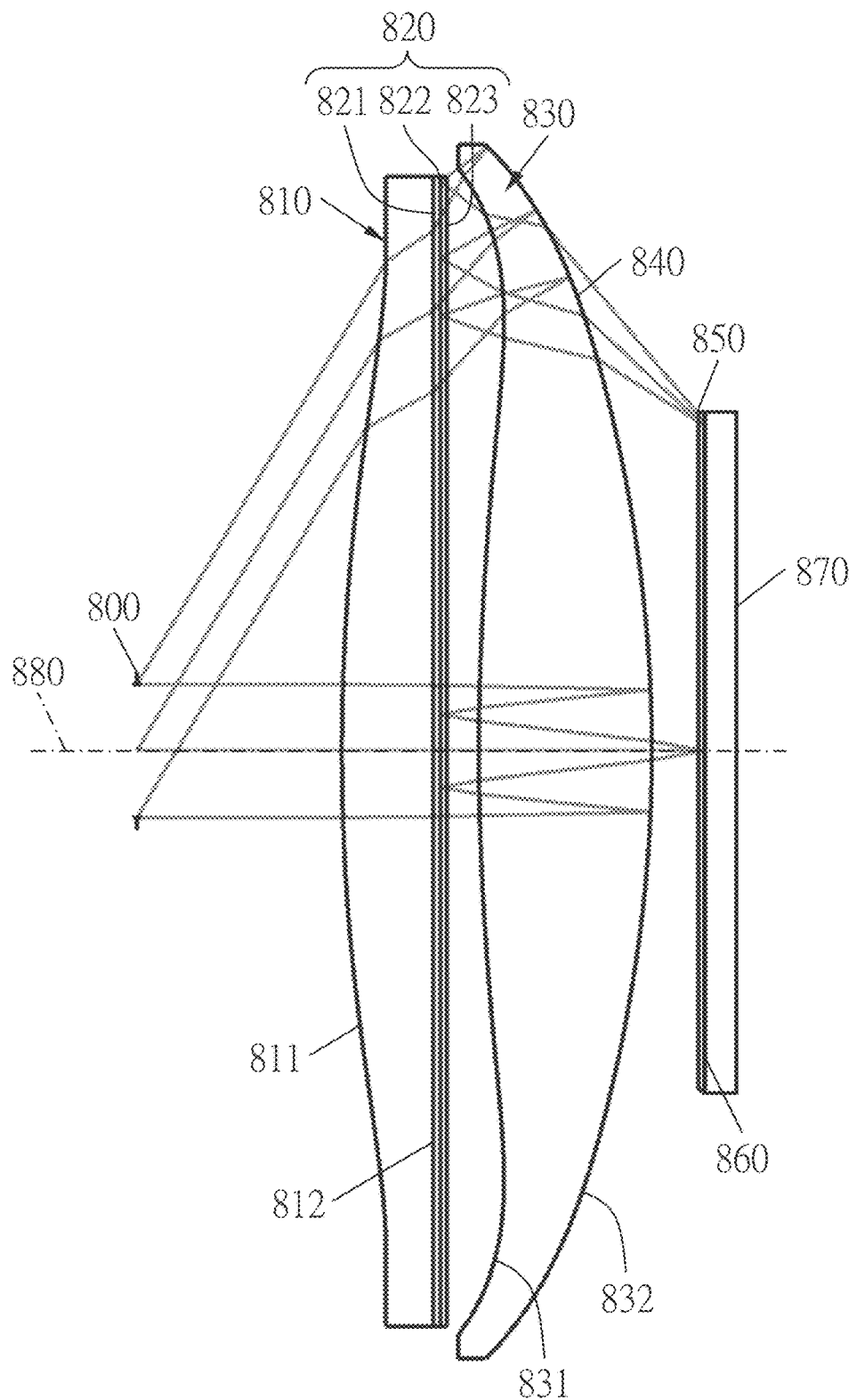
FIG. 8 shows an optical lens assembly in accordance with an eighth embodiment of the present invention.

Referring to FIG. 8, which shows an optical lens assembly in accordance with an eighth embodiment of the present invention, the optical lens assembly in accordance with the eighth embodiment of the present invention includes, in order from a visual side to an image source side along an optical axis 880: a stop 800, a first lens 810, an optical element 820, a second lens 830, a partial-reflective-partial-transmissive element 840, a second phase retarder 850, and an image source plane 860. The optical lens assembly has a total of two lenses with refractive power but is not limited thereto. The optical lens assembly works in cooperation with an image source 870. The image source plane 860 can be located at the image source 870. The image source 870 may be a liquid crystal display, an OLED display, or a LED display, but is not limited thereto. The position of the stop 800 may be that where the user's eyes view the image.

The first lens 810 with positive refractive power includes a visual-side surface 811 and an image source-side surface 812, the visual-side surface 811 of the first lens 810 is convex in a paraxial region thereof, the image source-side surface 812 of the first lens 810 is flat in a paraxial region thereof, and the visual-side surface 811 of the first lens 810 is aspheric.

The optical element 820 comprises, in order from the visual side to the image source side: an absorptive polarizer 821, a reflective polarizer 822 and a first phase retarder 823. These three elements may be stacked (e.g. but not limited to film) on the image source-side surface 812 of the first lens 810, and the opposite two surfaces of the elements are flat. Specifically, the absorptive polarizer 821 is attached to the image source-side surface 812, the reflective polarizer 822 is attached to the absorptive polarizer 821, and the first phase retarder 823 is attached to the reflective polarizer 822. The first phase retarder 823 is for example but not limited to a quarter-wave plate.

The second lens 830 with positive refractive power includes a visual-side surface 831 and an image source-side surface 832, the visual-side surface 831 of the second lens 830 is convex in a paraxial region thereof, the image source-side surface 832 of the second lens 830 is convex in a paraxial region thereof, and the visual-side surface 831 and the image source-side surface 832 of the second lens 830 are aspheric.

The partial-reflective-partial-transmissive element 840 is disposed (e.g. but not limited to coating film) on the image source-side surface 832 of the second lens 830 and has an average light reflectance of at least 30% in the visible light range, preferably 50% average light reflectance. The average light reflectance here refers to the average value of the reflectance of the partial-reflective-partial-transmissive element 840 for different wavelengths.

The second phase retarder 850 is disposed between the partial-reflective-partial-transmissive element 840 and the image source plane 860 and near the image source plane 860. The second phase retarder 850 is for example but not limited to a quarter-wave plate.

The detailed data of the eighth embodiment is shown in Tables 28-31.

TABLE 28

Embodiment 8
f = 21.73 mm, EPD = 8.00 mm, FOV = 120.0 deg.

| Surface | | Curvature Radius | Thickness/gap | Index (nd) | Abbe # (vd) | Effective focal length (EFL) |
|---|---|---|---|---|---|---|
| 0 | | infinity | −2500.000 | — | — | — |
| 1 | Stop | infinity | 12.000 | — | — | — |
| 2 | First lens | 135.417 | 5.334 | 1.544 | 55.9 | 248.16 |
| 3 | Absorptive polarizer | infinity | 0.100 | 1.533 | 56.0 | — |
| 4 | Reflective polarizer | infinity | 0.100 | 1.533 | 56.0 | — |
| 5 | First phase retarder | infinity | 0.100 | 1.533 | 56.0 | — |
| 6 | | infinity | 2.262 | — | — | — |
| 7 | Second lens | 144.651 | 10.152 | 1.544 | 55.9 | — |
| 8 | Partial-reflective-partial-transmissive element | −85.320 | −10.152 | mirror | | — |
| 9 | | 144.651 | −2.262 | — | — | — |
| 10 | First phase retarder | infinity | −0.100 | 1.533 | 56.0 | — |
| 11 | Reflective polarizer | infinity | −0.100 | 1.533 | 56.0 | — |
| 12 | | infinity | 0.100 | mirror | | — |
| 13 | First phase retarder | infinity | 0.100 | 1.533 | 56.0 | — |
| 14 | | infinity | 2.262 | — | — | — |
| 15 | Second lens | 144.651 | 10.152 | 1.544 | 55.9 | 99.90 |
| 16 | | −85.320 | 2.438 | — | — | — |
| 17 | Second phase retarder | infinity | 0.100 | 1.533 | 56.0 | — |
| 18 | Image source plane | infinity | — | — | — | — |

Note:
the reference wavelength is 555 nm

TABLE 29

Aspheric Coefficients

| Surface | 2 | 7 | 8 | 9 | 15 | 16 |
|---|---|---|---|---|---|---|
| K: | 1.4194E+01 | 0.0000E+00 | 2.7367E+00 | 0.0000E+00 | 0.0000E+00 | 2.7367E+00 |
| A2: | 0.0000E+00 | 0.0000E+00 | 0.0000E+00 | 0.0000E+00 | 0.0000E+00 | 0.0000E+00 |
| A4: | 1.7422E−06 | −3.0052E−06 | 5.1916E−07 | −3.0052E−06 | −3.0052E−06 | 5.1916E−07 |
| A6: | −5.7554E−09 | 7.1301E−09 | 1.3332E−09 | 7.1301E−09 | 7.1301E−09 | 1.3332E−09 |
| A8: | −7.0724E−12 | −8.3796E−12 | −3.8739E−13 | −8.3796E−12 | −8.3796E−12 | −3.8739E−13 |
| A10: | 3.8673E−14 | −3.3525E−15 | −8.5782E−16 | −3.3525E−15 | −3.3525E−15 | −8.5782E−16 |
| A12: | −6.8425E−17 | 7.0308E−18 | −1.4677E−18 | 7.0308E−18 | 7.0308E−18 | −1.4677E−18 |
| A14: | 5.9007E−20 | −2.3845E−21 | 1.6597E−21 | −2.3845E−21 | −2.3845E−21 | 1.6597E−21 |
| A16: | −2.1294E−23 | 0.0000E+00 | −1.1545E−25 | 0.0000E+00 | 0.0000E+00 | −1.1545E−25 |
| A18: | 0.0000E+00 | 0.0000E+00 | −8.6115E−29 | 0.0000E+00 | 0.0000E+00 | −8.6115E−29 |
| A20: | 0.0000E+00 | 0.0000E+00 | −6.4314E−32 | 0.0000E+00 | 0.0000E+00 | −6.4314E−32 |

TABLE 30

| | | | |
|---|---|---|---|
| f(mm) | 21.73 | R2(mm) | Infinity |
| f1(mm) | 248.16 | R3(mm) | 144.651 |
| f2(mm) | 99.90 | R4(mm) | −85.320 |
| EPD(mm) | 8.00 | nd1 | 1.544 |
| Fno | 2.72 | nd2 | 1.544 |
| FOV(deg.) | 120.0 | vd1 | 55.9 |
| CT1(mm) | 5.334 | vd2 | 55.9 |
| CT2(mm) | 10.152 | TL(mm) | 20.586 |
| T2M(mm) | 12.660 | IMH(mm) | 19.564 |
| T1M(mm) | 15.252 | TDP1(mm) | 2.564 |
| R1(mm) | 135.417 | — | — |

TABLE 31

| | | | |
|---|---|---|---|
| IMH/f | 0.90 | R1/TL | 6.58 |
| f2/f1 | 0.40 | (vd1*nd1)/vd2 | 1.54 |
| CT2/CT1 | 1.90 | R1/R4 | −1.59 |
| CT1/TDP1 | 2.08 | R4/R3 | −0.59 |
| f/f1 | 0.09 | T2M/CT2 | 1.25 |
| R1/f1 | 0.55 | TL/IMH | 1.05 |
| f/f2 | 0.22 | R4/nd2 (mm) | −55.26 |
| R4/f2 | −0.85 | — | — |

In the eighth embodiment, the equation of the aspheric surface profiles of the aforementioned lenses is the same as the equation of the aspheric surface profiles of the aforementioned lenses in the first embodiment. The values of the parameters in Table 30 can be calculated from Tables 28 and 29. The values of the conditions in Table 31 can be calculated from Table 30.

Ninth Embodiment

Figure 9:
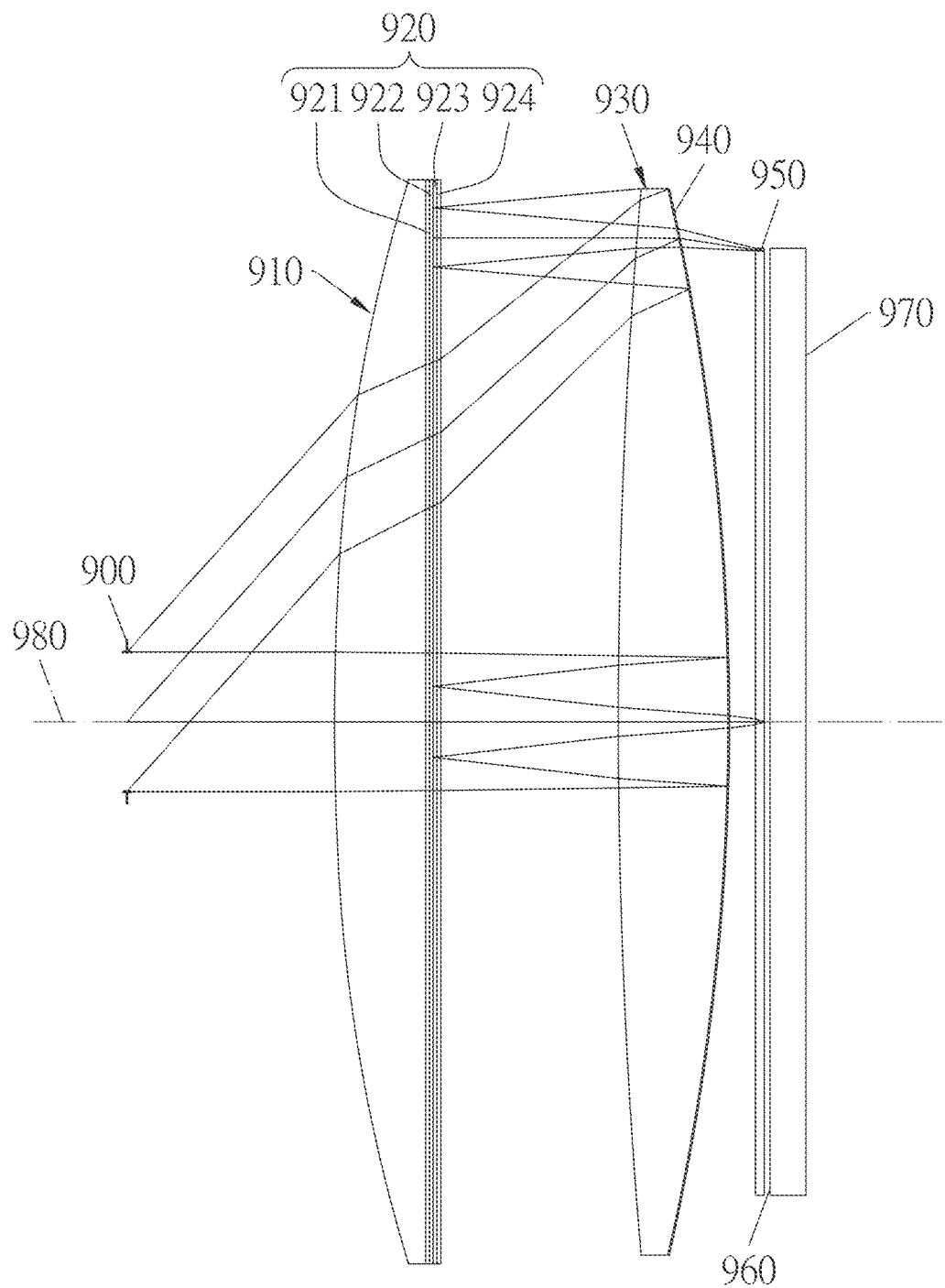
FIG. 9 shows an optical lens assembly in accordance with a ninth embodiment of the present invention.

Referring to FIG. 9, which shows an optical lens assembly in accordance with a ninth embodiment of the present invention, the optical lens assembly in accordance with the ninth embodiment of the present invention includes, in order from a visual side to an image source side along an optical axis 980: a stop 900, a first lens 910, an optical element 920, a second lens 930, a partial-reflective-partial-transmissive element 940, a second phase retarder 950, and an image source plane 960. The optical lens assembly has a total of two lenses with refractive power but is not limited thereto. The optical lens assembly works in cooperation with an image source 970. The optical element 920 includes, in order from the visual side to the image source side: an absorptive polarizer 921, a reflective polarizer 922 and a first phase retarder 923.

The configuration of the stop 900, the first lens 910, the absorptive polarizer 921, the reflective polarizer 922, the first phase retarder 923, the second lens 930, the partial-reflective-partial-transmissive element 940, the second phase retarder 950, the image source plane 960 and the image source 970 may be the same as that of one of the first to eighth embodiments and will not be explained again.

The optical element 920 further includes an anti-reflection film 924 that is closer to the image source side than the first phase retarder 923 and may be stacked (e.g. but not limited to film) on the first phase retarder 923. The opposite two surfaces of the anti-reflection film 924 are flat.

For the optical lens assembly in the present invention, the lenses can be made of plastic or glass. If the lenses are made of plastic, it is conducive to reducing the manufacturing cost. If the lenses are made of glass, it is conducive to enhancing the degree of freedom in the arrangement of refractive power of the optical lens assembly. Moreover, one or both of the object-side and image-side surfaces of one or more lenses of the optical lens assembly can be aspheric, and the aspheric surface can have any profile shape other than the profile shape of a spherical surface, so more variables can be used in the design of aspheric surfaces (than spherical surfaces), which is conducive to reducing the aberration and the number of lenses, as well as the total length of the optical lens assembly.

In the present optical lens assembly, if the surface shape of a respective lens surface of a respective lens with refractive power is convex and the location of the convex portion of the respective lens surface of the respective lens is not defined, the convex portion is typically located in a paraxial region of the respective lens surface of the respective lens. If the surface shape of a respective lens surface of a respective lens is concave and the location of the concave portion of the respective lens surface of the respective lens is not defined, the concave portion is typically located in a paraxial region of the respective lens surface of the respective lens.

Figure 11:
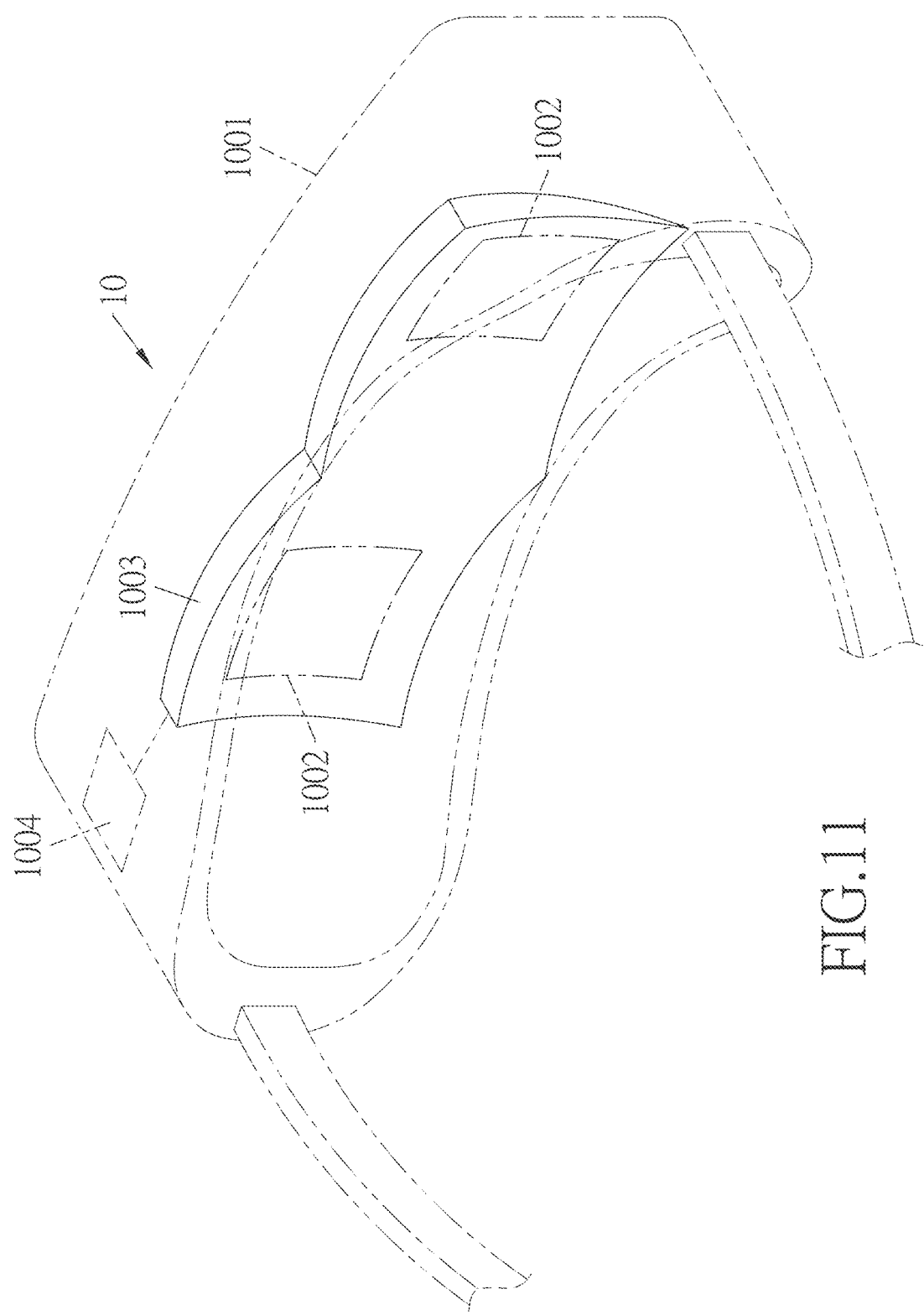
FIG. 11 shows a head-mounted electronic device in accordance with an embodiment of the present invention.

The optical lens assembly of the present invention can be used in head-mounted electronic devices as required. Referring to FIG. 11, which shows a head-mounted electronic device in accordance with an embodiment of the present invention, the head-mounted electronic device 10 is a head-mounted display device using, but not limited to, virtual reality (VR) technology, and includes a housing 1001, an optical module 1002, an image source 1003 and a controller 1004. The optical module 1002, the image source 1003 and the controller 1004 are disposed in the housing 1001.

The optical module 1002 corresponds to the left and right eyes of the user, respectively. The optical module 1002 includes an optical lens assembly that may be the optical lens assembly described in any one of the first to ninth embodiments.

The image source 1003 may be the image source described in any one of the first to ninth embodiments. The image source 1003 may correspond to the left and right eyes of the user, respectively, and the type of the image source 1003 may be a liquid crystal display, LED display, or OLED display, but is not limited thereto.

The controller 1004 is electrically connected to the image source 1003, so as to control the image source 1003 to display the image, such that the head-mounted electronic device 10 can project a stereoscopic image to the eyes of the user to form a virtual image.

What is claimed is:

1. An optical lens assembly, in order from a visual side to an image source side, comprising:
   a first lens with positive refractive power, comprising a visual-side surface, and the visual-side surface of the first lens being convex in a paraxial region thereof;
   an optical element, in order from the visual side to the image source side, comprising an absorptive polarizer, a reflective polarizer and a first phase retarder;
   a second lens with positive refractive power, comprising a visual-side surface and an image source-side surface, the image source-side surface of the second lens being convex in a paraxial region thereof, and at least one of the visual-side surface and the image source-side surface of the second lens being aspheric;
   a partial-reflective-partial-transmissive element;
   a second phase retarder; and
   an image source plane;
   wherein a focal length of the optical lens assembly is f, a maximum image-source height of the optical lens assembly is IMH, a focal length of the first lens is f1, a focal length of the second lens is f2, a central thickness of the first lens along an optical axis is CT1, a displacement in parallel to the optical axis from an intersection between the visual-side surface of the first lens and the optical axis to a maximum effective radius position on the visual-side surface of the first lens is TDP1, and following conditions are satisfied: 0.40<IMH/f<1.26, 0.21<f2/f1<2.35, and 0.98<CT1/TDP1<5.79.

2. The optical lens assembly as claimed in claim 1, wherein the central thickness of the first lens along an optical axis is CT1, a central thickness of the second lens along the optical axis is CT2, and a following condition is satisfied: 0.62<CT2/CT1<6.97.

3. The optical lens assembly as claimed in claim 1, wherein the focal length of the optical lens assembly is f, the focal length of the first lens is f1, and a following condition is satisfied: 0.04<f/f1<0.28.

4. The optical lens assembly as claimed in claim 1, wherein a radius of curvature of the visual-side surface of the first lens is R1, the focal length of the first lens is f1, and a following condition is satisfied: 0.33<R1/f1<0.76.

5. The optical lens assembly as claimed in claim 1, wherein the focal length of the optical lens assembly is f, the focal length of the second lens is f2, and a following condition is satisfied: 0.07<f/f2<0.30.

6. The optical lens assembly as claimed in claim 1, wherein a radius of curvature of the image source-side surface of the second lens is R4, the focal length of the second lens is f2, and a following condition is satisfied: −1.20<R4/f2<−0.22.

7. The optical lens assembly as claimed in claim 1, wherein a distance from the visual-side surface of the first lens to the image source plane along an optical axis is TL, a radius of curvature of the visual-side surface of the first lens is R1, and a following condition is satisfied: 2.05<R1/TL<12.83.

8. The optical lens assembly as claimed in claim 1, wherein an Abbe number of the first lens is vd1, an Abbe number of the second lens is vd2, a refractive index of the first lens is nd1, and a following condition is satisfied: 0.93<(vd1*nd1)/vd2<2.16.

9. The optical lens assembly as claimed in claim 1, wherein a radius of curvature of the visual-side surface of the first lens is R1, a radius of curvature of the image source-side surface of the second lens is R4, and a following condition is satisfied: −2.74<R1/R4<−0.54.

10. The optical lens assembly as claimed in claim 1, wherein a radius of curvature of the visual-side surface of the second lens is R3, a radius of curvature of the image source-side surface of the second lens is R4, and a following condition is satisfied: −0.83<R4/R3<0.49.

11. The optical lens assembly as claimed in claim 1, wherein a distance from the visual-side surface of the second lens to the image source plane along an optical axis is T2M, a central thickness of the second lens along the optical axis is CT2, and a following condition is satisfied: 0.68<T2M/CT2<2.37.

12. The optical lens assembly as claimed in claim 1, wherein a distance from the visual-side surface of the first lens to the image source plane along an optical axis is TL, the maximum image-source height of the optical lens assembly is IMH, and a following condition is satisfied: 0.54<TL/IMH<1.80.

13. The optical lens assembly as claimed in claim 1, wherein a radius of curvature of the image source-side surface of the second lens is R4, a refractive index of the second lens is nd2, and a following condition is satisfied: −116.45 mm<R4/nd2<−19.09 mm.

14. A head-mounted electronic device, comprising:
a housing;
the optical lens assembly of claim 1 disposed in the housing;
an image source disposed on the image source plane of the optical lens assembly in the housing; and
a controller disposed in the housing and electrically connected to the image source.

15. The head-mounted electronic device as claimed in claim 14, wherein a radius of curvature of the visual-side surface of the first lens is R1, a radius of curvature of the image source-side surface of the second lens is R4, and a following condition is satisfied: −2.74<R1/R4<−0.54.

16. The head-mounted electronic device as claimed in claim 14, wherein a radius of curvature of the visual-side surface of the second lens is R3, a radius of curvature of the image source-side surface of the second lens is R4, and a following condition is satisfied: −0.83<R4/R3<0.49.

17. The head-mounted electronic device as claimed in claim 14, wherein a distance from the visual-side surface of the first lens to the image source plane along an optical axis is TL, the maximum image-source height of the optical lens assembly is IMH, and a following condition is satisfied: 0.54<TL/IMH<1.80.

* * * * *